(12) United States Patent
Hayase

(10) Patent No.: US 6,968,534 B1
(45) Date of Patent: Nov. 22, 2005

(54) METHOD FOR CONSTRUCTING SERVICE PROVIDING SYSTEM

(75) Inventor: Takeo Hayase, Chofu (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 375 days.

(21) Appl. No.: 09/661,916

(22) Filed: Sep. 14, 2000

(30) Foreign Application Priority Data

Sep. 29, 1999 (JP) .............................. 11-277497

(51) Int. Cl.[7] .............................................. G06F 9/44

(52) U.S. Cl. ........................................ 717/104; 717/105

(58) Field of Search ................................ 717/104, 105

(56) References Cited

U.S. PATENT DOCUMENTS

| | | | | |
|---|---|---|---|---|
| 5,668,998 A | * | 9/1997 | Mason et al. ............... | 717/104 |
| 5,797,041 A | * | 8/1998 | Yasue et al. ................ | 709/250 |
| 5,815,415 A | * | 9/1998 | Bentley et al. ............... | 703/4 |
| 6,170,081 B1 | * | 1/2001 | Fontana et al. ............. | 717/104 |
| 6,199,195 B1 | * | 3/2001 | Goodwin et al. ........... | 717/104 |
| 6,446,253 B1 | * | 9/2002 | Mellmer ..................... | 717/104 |

OTHER PUBLICATIONS

Tantiprasut, et al. "ASN. 1 Protocol Specification for Use With Arbitrary Encoding Schemes", 1997, IEEE, p. 502-513.*

A System of Patterns, Frank Buschmann et al., 1996, pp. 125-143.

* cited by examiner

Primary Examiner—Tuan Dam
Assistant Examiner—Qamrun Nahar
(74) Attorney, Agent, or Firm—Finnegan, Henderson, Farabow, Garrett & Dunner, L.L.P.

(57) ABSTRACT

A monitoring system is constructed using a framework 1 described by an object-oriented language. The framework 1 includes a model part 10 for holding data relating to an external apparatus serving as an object to be monitored, a view part 20 provided between the monitoring system and a user, a proxy part 40 for exchanging data between the monitoring system and the external apparatus in accordance with a predetermined protocol, and a controller part 30. The controller part 30 controls data of the model part 10, and connects the model part 10 with the view part 20 to provide various services for the external apparatus on the basis of data which are given from the user or the external apparatus. The proxy part 40 converts communication data into a format of internal data which is handled in the monitoring system. Thus, it is possible to provide a service providing system capable of improving the stability of the architecture of a software against specification change and extension, and of improving the reusability and change facility of the software.

16 Claims, 21 Drawing Sheets

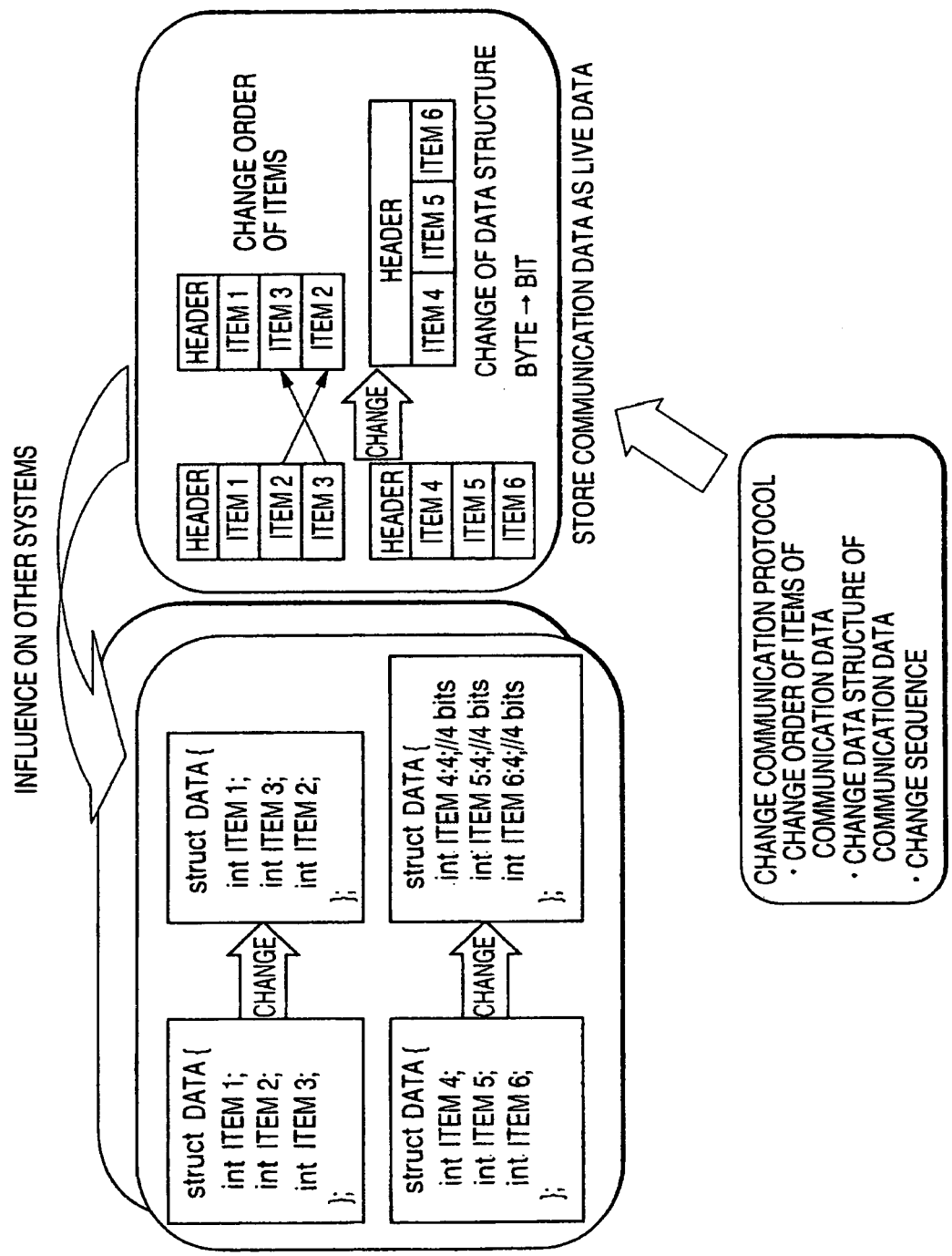
FIG. 31 -- Prior Art --

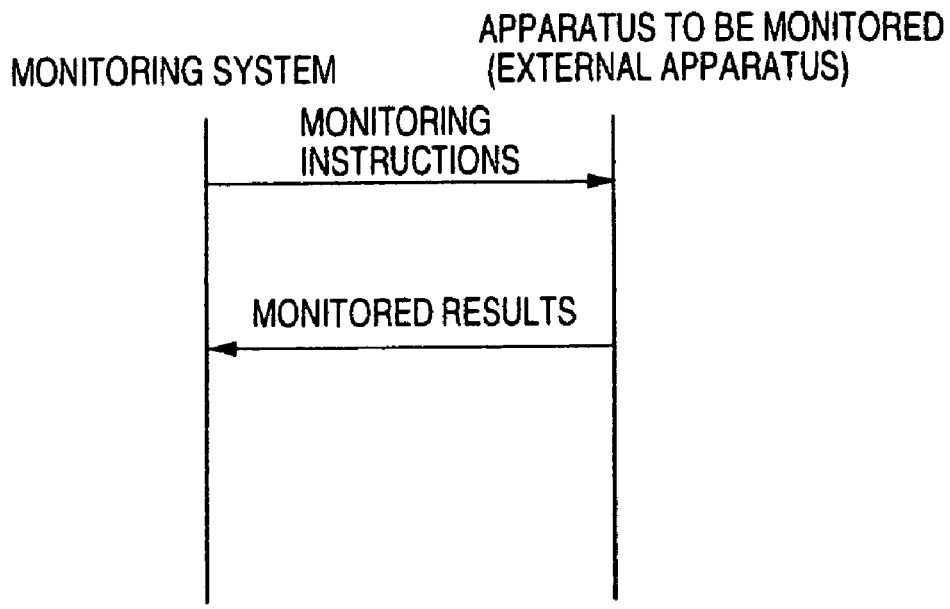
FIG.32A -- Prior Art --
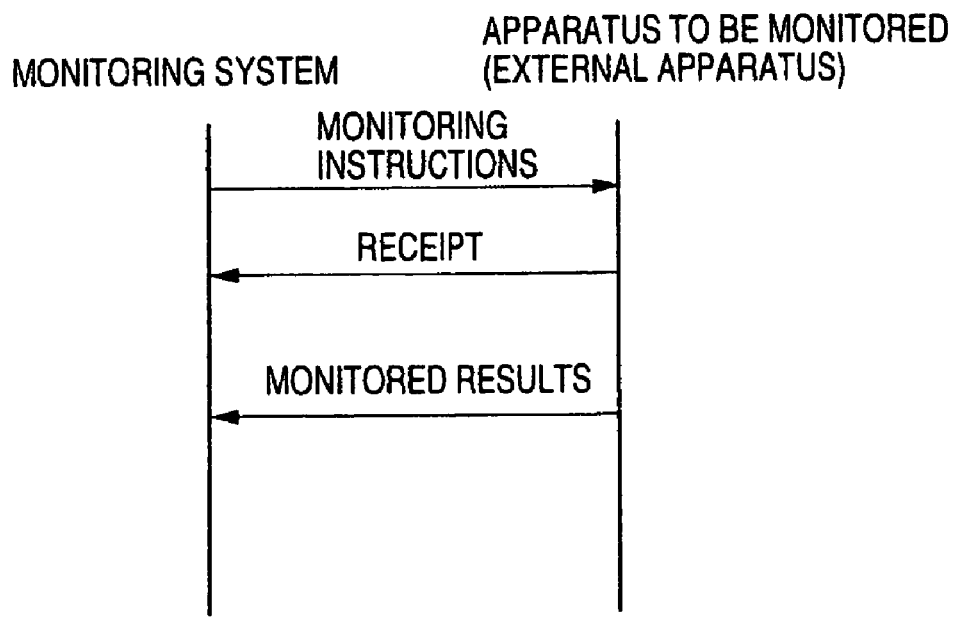
FIG.32B -- Prior Art --

METHOD FOR CONSTRUCTING SERVICE PROVIDING SYSTEM

BACKGROUND OF THE INVENTION

1. Field of the Invention

The present invention relates generally to a method for constructing a service providing system, such as a system for monitoring an external apparatus. More specifically, the invention relates to a method for constructing a serving providing system using a framework for service providing system, which is described by an object-oriented language or the like; a service providing system constructed by the method; and a computer readable recording media in which a program for service providing system or a framework for service providing system has been recorded.

2. Description of the Related Art

As a service providing system for providing service for an object system, there is known a monitoring system for exchanging monitoring instructions and monitored results with an external apparatus (an object system) serving as a service provided object to provide various services, such as the setting of initial data, build-up and tabulation of data, for the external apparatus. Such a monitoring system is generally constructed as a software capable of being executed on a computer system. In such a monitoring system, specification change and extension are carried out in accordance with the kind of external apparatuses serving as an object to be monitored, the kind of screens for interface provided between the monitoring system and a user, the kind of data used in the external apparatus, and the kind of services provided for the external apparatus.

However, any reference models for uniformly expressing the configuration of monitoring systems and service are not conventionally established, so that there are problems in that if specification change or extension is carried out, the architecture of the software is likely to be unstable, and the reusability and change facility of the software can not easily be ensured.

For example, in conventional monitoring systems, internal data handled in the monitoring system are not distinguished from communication data reflecting a communication protocol between the monitoring system and the external apparatus, and communication data exchanged between the monitoring system and the external apparatus are stored in the monitoring system as they are. The stored data are suitably referred and updated to carry out various services. Therefore, as shown in FIG. 31, if the communication protocol between the monitoring system and the external apparatus is changed, the change of the communication protocol influences the whole monitoring system although the service on the side of the monitoring system is not changed.

Specifically, if the order of items of the communication data and the data structure thereof are changed in accordance with the change of the communication protocol, the order of items of data is changed in the monitoring system, and the data structure thereof is changed therein, for example, from bytes to bits. In addition, such change of the data structure also influences other system configurations in the monitoring system for referring to and updating the data, so that it is required to change methods for referring to and updating the data.

In addition, a sequence itself is sometimes changed in accordance with the change of the communication protocol. For example, if an external apparatus serving as an apparatus to be monitored is changed from an old style apparatus to an advanced apparatus or to an apparatus produced by another company, it is often required to change the sequence in accordance with the setting on the side of the apparatus and so forth. In this case, examples are shown in FIGS. 32A and 32B. As shown in FIGS. 32A and 32B, an external apparatus A uses a sequence wherein if monitoring instructions are issued from the side of a monitoring system, processing is carried out on the side of the external apparatus to simply return monitored results. In addition, an external apparatus B uses a sequence wherein if monitoring instructions are issued from the side of a monitoring system, a receipt (a notice meaning that monitoring is not executed although monitoring instructions are received) is once returned from the external apparatus, and thereafter, processing is actually carried out on the side of the external apparatus to return monitored results. Therefore, if the apparatus is changed between such external apparatuses A and B, it is required to change the sequence.

SUMMARY OF THE INVENTION

It is therefore an object of the present invention to eliminate the aforementioned problems and to provide a method for constructing a service providing system, such as a monitoring system; a service providing system; and a computer readable recording medium in which a program for service providing system or a framework for service providing system has been recorded, the method, system and program being capable of improving the stability of the architecture of a software against specification change and extension and of improving the reusability and change facility of the software.

In order to accomplish the aforementioned and other objects, according to a first aspect of the present invention, there is provided a method for constructing a service providing system using a framework for service providing system which provides a service for an object system, the method comprising the steps of: preparing a framework for service providing system, which includes a data holding part for holding data relating to an object system, a user interface part for receiving instructions from a user and for presenting data to the user, an object system interface part for exchanging data between the object system interface part and the object system in accordance with a predetermined protocol, and an integrated control part for controlling the data holding part, the user interface part and the object system interface part; preparing a plurality of classes on the basis of each of the data holding part, the user interface part, the object system interface part and the integrated control part of the framework for service providing system; associating the classes with each other; and defining a sequence carried out between the respective classes.

In the framework for service providing system, the integrated control part preferably controls data which are held in the data holding part, and connects the data holding part with the user interface part to provide various services for the object system on the basis of data which are given from the user or the object system. In addition, in the framework for service providing system, the object system interface part preferably converts external data, which are exchanged between the object system interface part and the object system, into a format of intermediate data which is independent of the protocol, and the integrated control part preferably converts the intermediate data into a format of internal data which is handled in the service providing system, the data holding part and user interface part handling the internal data which have been converted by the integrated control part. Furthermore, the service providing system is preferably a monitoring system for monitoring an external apparatus serving as the object system, a control system for controlling a controlled apparatus serving as the object system, or an information system for exchanging information between the service providing system and an information system serving as the object system.

According to a second aspect of the present invention, there is provided a service providing system for exchanging service providing instructions and service provided results between the service providing system and an object system to providing various services for the object system, the service providing system comprising: a data holding part for holding data which relate to an object system; a user interface part for receiving instructions from a user and for presenting data to the user; an object system interface part for exchanging data between the object system interface part and the object system; and an integrated control part for controlling the data holding part, the user interface part and the object system interface part, wherein the integrated control part controls data which are held in the data holding part, and connects the data holding part with the user interface part to provide various services for the object system on the basis of data which are given from the user or the object system.

Preferably, the object system interface part converts external data, which are exchanged between the object system interface part and the object system, into a format of intermediate data which is independent of the protocol, and the integrated control part converts the intermediate data into a format of internal data which is handled in the service providing system, the data holding part and user interface part handling the internal data which have been converted by the integrated control part.

According to a third aspect of the present invention, there is provided a computer readable recording medium, in which a program for service providing system has been recorded, the program for service providing system comprising, as means for operating a computer: data holding means for holding data which relate to an object system; user interface means for receiving instructions from a user and for presenting data to the user; object system interface means for exchanging data between the object system interface means and the object system; and integrated control means for controlling the data holding means, the user interface means and the object system interface means, wherein the integrated control means controls data which are held in the data holding means, and connects the data holding means with the user interface means to provide various services for the object system on the basis of data which are given from the user or the object system.

Preferably, the object system interface means converts external data, which are exchanged between the object system interface means and the object system, into a format of intermediate data which is independent of the protocol, and the integrated control means converts the intermediate data into a format of internal data which is handled in the service providing system, the data holding means and user interface means handling the internal data which have been converted by the integrated control means.

According to a fourth aspect of the present invention, there is provided a computer readable recording medium, in which a program for service providing system has been recorded, the program for service providing system comprising, as means for operating a computer: internal system means for realizing various services which are provided for an object system; object system interface means for exchanging data between the object system interface means and the object system; and integrated control means for controlling the internal system means and the object system interface means, wherein the object system interface means converts external data, which are exchanged between the object system interface means and the object system, into a format of intermediate data which is independent of a protocol, and the integrated converts the intermediate data into a format of internal data which is handled by the internal system.

According to a fifth aspect of the present invention, there is provided a computer readable recording medium, in which a framework for service providing system has been recorded, the framework for service providing system comprising: a data holding part for holding data which relate to an object system; a user interface part for receiving instructions from a user and for presenting data to the user; an object system interface part for exchanging data between the object system interface part and the object system; and an integrated control part for controlling the data holding part, the user interface part and the object system interface part, wherein the integrated control part controls data which are held in the data holding part, and connects the data holding part with the user interface part to provide various services for the object system on the basis of data which are given from the user or the object system.

Preferably, the object system interface part converts external data, which are exchanged between the object system interface part and the object system, into a format of intermediate data which is independent of the protocol, and the integrated control part converts the intermediate data into a format of internal data which is handled in the service providing system, the data holding part and user interface part handling the internal data which have been converted by the integrated control part. In addition, each of the data holding part, the object system interface part and the integrated control part preferably includes a class which is prepared every kind of object systems, and the user interface part preferably includes a class which is prepared every kind of screens for interface. Moreover, the class included in the data holding part is preferably prepared every kind of data, which are used in the object systems, in addition to the kind of the object systems. In addition, the class included in the integrated control part is preferably prepared every kind of services, which are provided for the object systems, in addition to the kind of the object systems. Furthermore, the class included in the integrated control part preferably includes an upper class, which is prepared every kind of the object systems, and a lower class which is prepared every kind of services which are provided for the object systems under the upper class. Incidentally, it is preferable that the upper class and the lower class are prepared in accordance with the kind of the object system and the kind of services when a plurality of object systems are provided for accomplishing a united process.

Preferably, a class included in the integrated control part controls a class included in the data holding part; a class included in the user interface part updates and refers to the class included in the data holding part; data, which are given from the user and the object system, are exchanged between the class included in the user interface part and the class included in the integrated control part; and data, which relate to a service provided for the object system, are exchanged between the class included in the integrated control part and the class included in the object system interface part.

Preferably, when service providing instructions for the object system are given to a class included in a user interface part, the class included in the user interface part reflects data, which relate to service providing instructions, in a class included in the holding part, and gives a class included in the integrated control part notice of the service providing instructions, and the class included in the integrated control part acquires data of the class included in the data holding part, and transmits data of the class, which is included in the data holding part, to a class included in the object system interface part, the class included in the object system interface part adding data, which relate to a protocol, to data received from the integrated control part. In addition, preferably, when service provided results from the object system are given to a class included in an object system interface part, the class included in the object system interface part deletes data, which relate to a protocol, from data received from the object system, and gives a class, which is included in the integrated control part, notice of service provided results, the class included in the integrated control part reflecting data, which relate to service provided results, in a class included in the data holding part, and giving a class, which is included in the user interface, notice of service provided results, and the class included in the user interface part acquiring data, which relate to service provided results, from the class included in the data holding part.

Thus, according to the present invention, since a service providing system is constructed using a framework for service providing system which uniformly expresses the construction of a service providing system and services, it is possible to improve the stability of the architecture of a software against specification change and extension, and it is possible to improve the reusability and change facility of the software, so that it is possible to efficiently develop the service providing system.

In addition, according to the present invention, in the service providing system, the integrated control part controls data which are held in the data holding part, and connects the data holding part with the user interface part to provide various services for the object system on the basis of data which are given from the user or the object system, so that it is possible to reduce the mutual-dependence relation of the respective parts in the monitoring system to localize the modified range in accordance with specification change and extension.

Moreover, according to the present invention, the object system interface part converts external data, which are exchanged between the object system interface part and the object system, into a format of intermediate data which is independent of the protocol, and the integrated control part converts the intermediate data into a format of internal data which is handled in the service providing system, the data holding part and user interface part handling the internal data which have been converted by the integrated control part, so that the influence of the change of the communication protocol can be localized in the object system interface part.

In addition, according to the present invention, the class of each of the data holding part, the object system interface part and the integrated control part is prepared every kind of object systems, and the class of the user interface part is prepared every kind of screens for interface, so that it is possible to easily cope with the addition and deletion of the object systems and screens for interface. In addition, if the class of the data holding part is prepared every kind of data, which are used in object systems, in addition to the kind of the object systems, and if the class of the integrated control part is prepared every kind of services, which are provided for object systems, in addition to the kind of the object systems, it is possible to easily cope with the addition and deletion of data and services. Moreover, if the class of the integrated control part is divided into an upper class, which is prepared every kind of object systems, and a lower class which is prepared every kind of services which are provided for the object systems under the upper class, it is possible to easily cope with the addition and deletion of services for the same object system.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 31 is a schematic diagram for explaining a conventional monitoring system; and FIGS. 32A and 32B is a schematic diagram showing an example of the change of a communication protocol (the change of a sequence) in a conventional monitoring system.

DESCRIPTION OF THE PREFERRED EMBODIMENTS

Referring now to the accompanying drawings, the preferred embodiments of the present invention will be described below.

Figure 28:
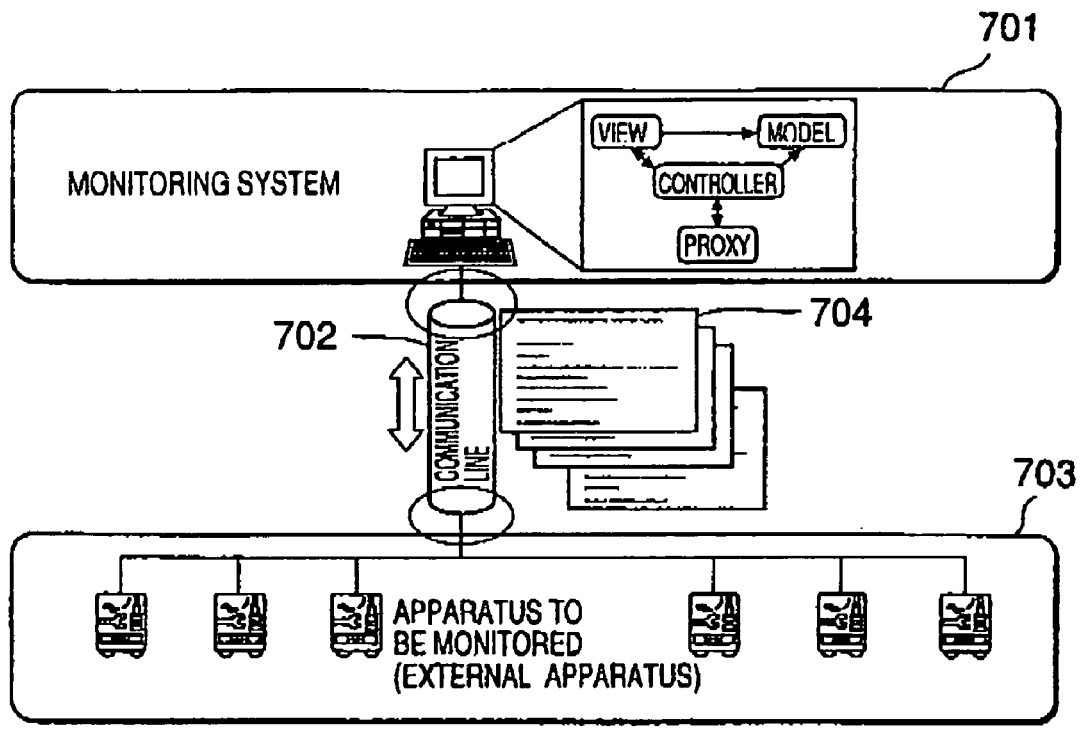
FIG. 28 is a schematic diagram showing an example of a monitoring system (a service providing system) according to the present invention.

First, referring to FIGS. 1 through 5, a preferred embodiment of a service providing system constructing method according to the present invention, and a service providing system constructed by the method will be described. Furthermore, in this preferred embodiment, as an example of a service providing system, a system for monitoring an external apparatus (an object system) will be described. As shown in FIG. 28, a monitoring system 701 is connected to various external apparatuses (apparatuses to be monitored) 703 via communication lines 702, such as a common carrier leased line, Internet, and a radio local area network (LAN), so that information 704 about monitoring instructions (service providing instructions) and monitored results (service provided results) is exchanged between the monitoring system 701 and the external apparatuses 703. Furthermore, the monitoring system 701 is an optional system, such as a road monitoring system, a station monitoring system or an electric power monitoring system.

Figure 1:
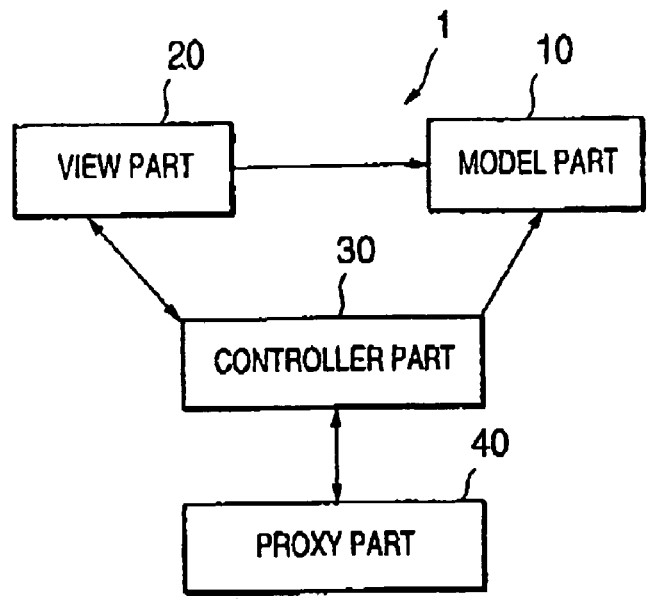
FIG. 1 is a block diagram showing a framework for monitoring system (service providing system) for use in a method for constructing a monitoring system according to the present invention.

FIG. 1 shows a framework for monitoring system 1, which is used for a monitoring system constructing method in this preferred embodiment. Furthermore, the framework for monitoring system 1 is realized as an abstract class described by an object-oriented language.

As shown in FIG. 1, the framework for monitoring system 1 comprises: a model part (a data holding part) 10 for holding data relating to the external apparatuses (see reference number 703 in FIG. 28) which are objects to be monitored; a view part (a user interface part) 20 for accepting user's instructions and for presenting data to the user; a proxy part (an object system interface) 40 for exchanging data between the proxy part 40 and the external apparatuses in accordance with a predetermined communication protocol; and a controller part (an integrated control part) 30 for controlling the model part 10, the view part 20 and the proxy part 40. Furthermore, the model part 10 and the view part 20 constitute internal system means.

Furthermore, in FIG. 1, the controller part 30 is designed to control data which are held in the model part 10, and to connect the model part 10 with the view part 20 to provide various services for the external apparatuses on the basis of data which are given from the user or the external apparatuses. In addition, the proxy part 40 is designed to convert communication data (external data), which are exchanged between the proxy part 40 and the external apparatuses, into intermediate data which do not depend on the communication protocol. In addition, the controller part 30 is designed to convert the intermediate data into an internal data format which is handled in the monitoring system. Moreover, the model part 10 and the view part 20 are designed to handle internal data which have been converted by the controller part 30.

Figure 2:
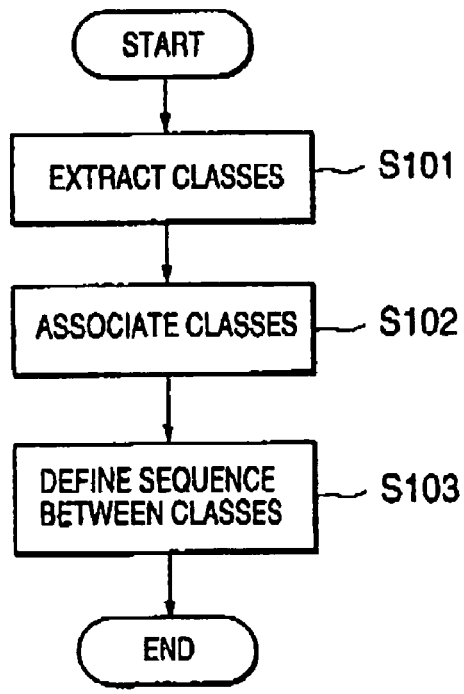
FIG. 2 is a flow chart for explaining a method for constructing a monitoring system according to the present invention.

FIG. 2 is a flow chart for explaining a method for constructing a monitoring system using the framework for monitoring system 1 shown in FIG. 1.

As shown in FIG. 2, the model part 10, view part 20, proxy part 40 and controller part 30, which are realized as abstract classes of the framework for monitoring system 1, are first inherited, respectively, to prepare a plurality of concrete classes (capsulated data and operations) (step 101). Then, the respective classes thus prepared are associated with each other (step 102). Finally, a sequence carried out between the respective classes thus associated is defined (step 103). Furthermore, the static side of the monitoring system is defined at each of steps 101 and 102, and the dynamic side of the monitoring system is defined at step 103.

Figure 3:
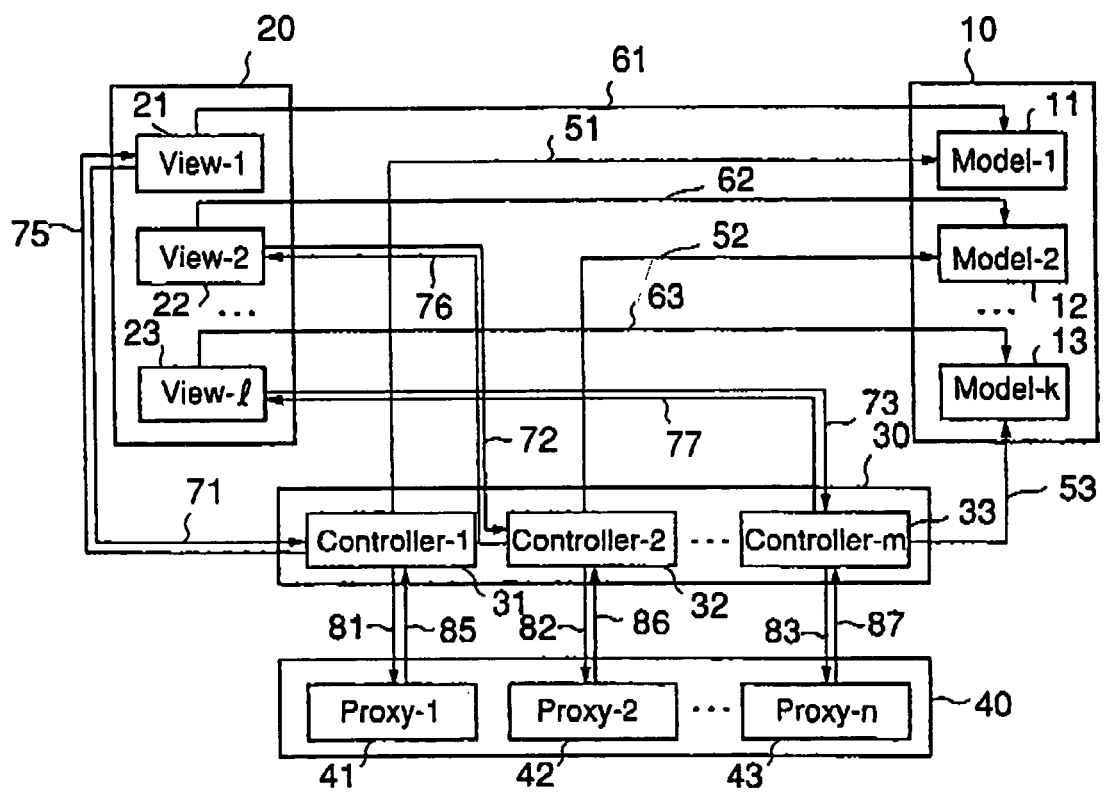
FIG. 3 is a block diagram showing an example of a class structure of a monitoring system constructed according to the present invention.

FIG. 3 shows an example of a class structure of the monitoring system which is constructed by the constructing method shown in FIG. 2.

As shown in FIG. 3, the monitoring system includes a plurality of classes which are prepared so as to correspond to the model part 10, view part 20, proxy part 40 and controller part 30 of the framework for monitoring system 1.

Among these parts, the model part 10 includes Model-1 through Model-k classes 11, 12 and 13 prepared every kind of the external apparatuses which are objects to be monitored. Furthermore, the Model-1 through Model-k classes are preferably prepared every kind of data used in the external apparatuses, if necessary. In addition, the view part 20 includes View-1 through View-1 classes 21, 22 and 23 prepared every kind of graphical user interface (GUI) screens which are screens for interface. In addition, the proxy part 40 includes Proxy-1 through Proxy-n classes 41, 42 and 43 prepared every kind of the external apparatuses which are objects to be monitored. Moreover, the controller part 30 includes Controller-1 through Controller-m classes 31, 32 and 33 prepared every kind of the external apparatuses which are objects to be monitored. Furthermore, the Controller-1 through Controller-m classes 31, 32 and 33 are preferably prepared every kind of services which are provided for the external apparatus, if necessary. Incidentally, it is preferable that the Controller-1 through Controller-m classes 31, 32 and 33 are prepared in accordance with the kind of the object systems and the kind of services when a plurality of object systems are provided for accomplishing a united process.

Furthermore, the respective classes thus prepared are associated with each other as shown in FIG. 3. That is, in FIG. 3, the Controller-1 through Controller-m classes 31, 32 and 33 of the controller part 30 are associated with each other so as to control (including refer and update) the Model-1 through Model-k classes 11, 12 and 13 of the model part 10 (associations 51, 52 and 53). In addition, the View-1 through View-1 classes 21, 22 and 23 of the view parts 20 are associated with each other so as to update or refer to the Model-1 through Model-k classes 11, 12 and 13 of the model part 10 (associations 61, 62 and 63). In addition, the View-1 through View-1 classes 21, 22 and 23 of the view part 20 are associated with the Controller-1 through Controller-m classes 31, 32 and 33 of the controller part 30 so as to exchange data which are given from the user and the external apparatuses, so that the View-1 through View-1 classes 21, 22 and 23 give the Controller-1 through Controller-m classes 31, 32 and 33 notice of a View event (an event on a GUI screen) (associations 71, 72 and 73) and so that the Controller-1 through Controller-m classes 31, 32 and 33 give the View-1 through View-1 classes 21, 22 and 23 notice a Proxy event (an event from the external apparatuses) (associations 75, 76 and 77). Moreover, the Controller-1 through Controller-m classes 31, 32 and 33 of the controller part 30 are associated with the Proxy-1 through Proxy-n classes 41, 42 and 43 of the proxy part 40 so as to exchange data which relate to the monitoring of the external apparatuses, so that the Controller-1 through Controller-m classes 31, 32 and 33 give the Proxy-1 through Proxy-n classes 41, 42 and 43 notice of monitoring instructions (associations 81, 82 and 83) and so that the Proxy-1 through Proxy-n classes 41, 42 and 43 give the Controller-1 through Controller-m classes 31, 32 and 33 notice of monitored results (associations 85, 86 and 87). Furthermore, the Model-1 through Model-k classes 11, 12 and 13 of the model part 10 are only referred by other classes, and do not utilize any classes.

Figure 4:
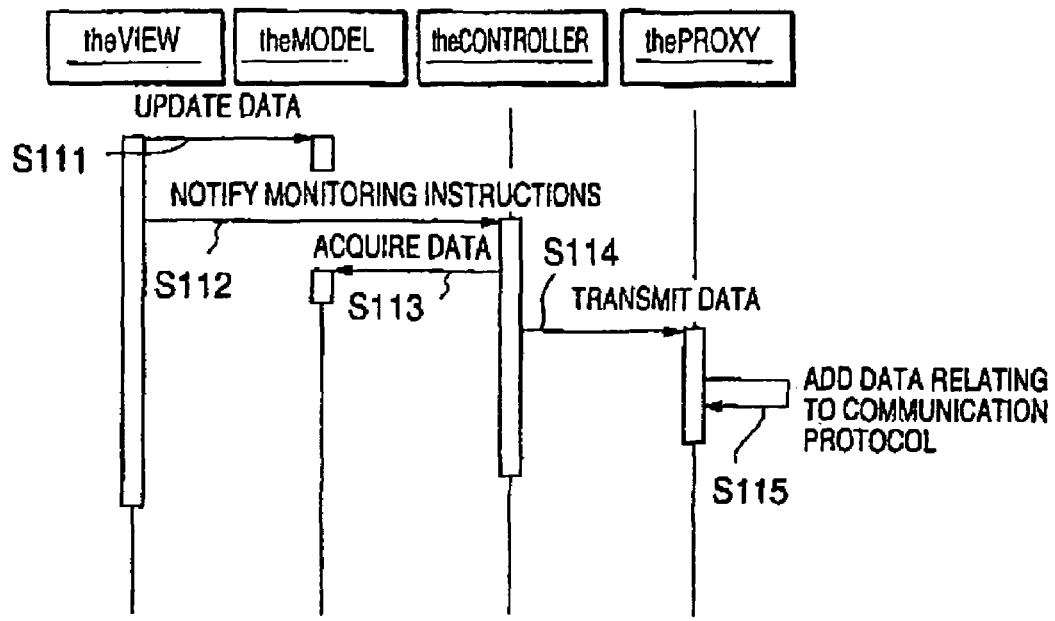
FIG. 4 is a sequence diagram showing an example of the operation of the monitoring system shown in FIG. 3.
Figure 5:
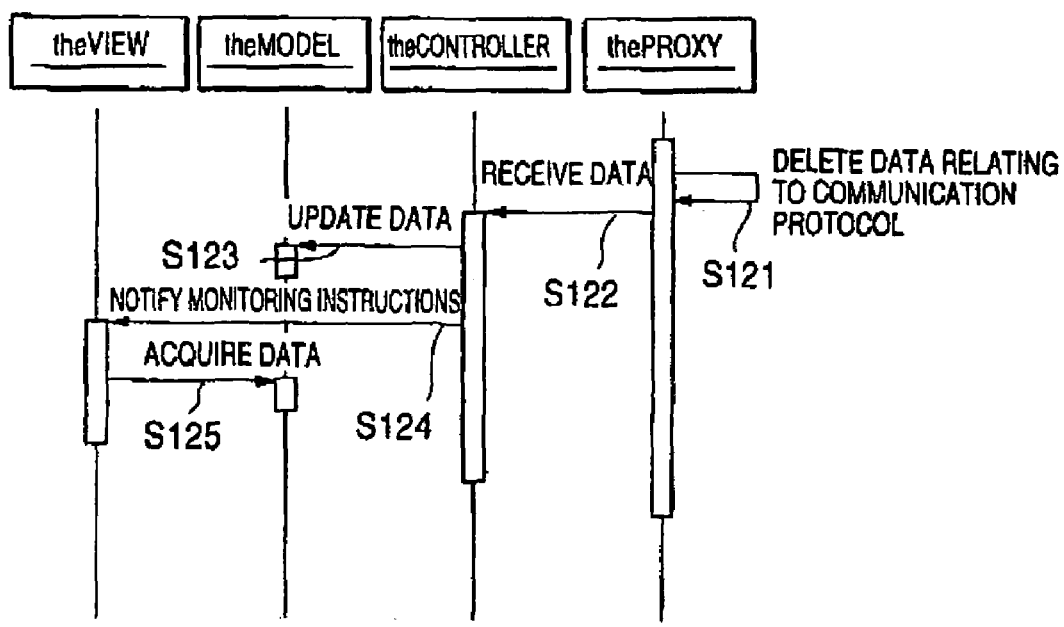
FIG. 5 is a sequence diagram showing another example of the operation of the monitoring system shown in FIG. 3.

FIGS. 4 and 5 show the operation of the monitoring system shown in FIG. 3. Furthermore, FIGS. 4 and 5 are sequence diagrams showing the flow of messages between objects (instances of classes). In these figures, objects are expressed by the blocks in the top stage, and the lapse of time is expressed in the direction of axis of ordinates. In addition, the transmission of each message is expressed by an arrow drawn from an object to another object.

FIG. 4 shows the operation when monitoring instructions to the external apparatuses, which are objects to be monitored, are given to the class (theView) of the View part 20. In this case, the class (theView) of the view part 20 reflects data, which relate to the monitoring instructions, in the class (theModel) of the model part 10 (step 111), and then, gives the class (theController) of the controller part 30 notice of monitoring instructions (step 112). Then, the class (theController) of the controller part 30 acquires data of the class (theModel) of the model part 10 (step 113), and then, transmits data of the class (theModel) of the model part 10 to the class (theProxy) of the proxy part 40 in the form of intermediate data (step 114). Finally, the class (theProxy) of the proxy part 40 adds data, which relate to the communication protocol, to the data (the intermediate data), and then, transmits the data to the external apparatuses.

FIG. 5 shows the operation when the monitored results from the external apparatus, which are objects to be monitored, are given to the class (theProxy) of the proxy part 40. In this case, the class (theClass) of the proxy part 40 deletes data, which relate to the communication protocol, from data received from the external apparatuses (step 121), and then, gives the class (theController) of the controller part 30 notice of monitored results in the form of intermediate data (step 122). Then, the class (theController) of the controller part 30 reflects data, which relate to the monitored results, in the class (theModel) of the model part 10 (step 123), and then, gives the class (theView) of the view part 20 notice of the monitored results (step 124). Finally, the class (theView) of the view part 20 acquires data, which relate to the monitored results, from the class (theModel) of the model part 10 (step 125).

Thus, according to this preferred embodiment, since the monitoring system is constructed using the framework for monitoring system 1 for uniformly expressing the monitoring system configuration and services, it is possible to improve the stability of the architecture of the software against specification change and extension and to improve the reusability and change facility of the software, so that it is possible to efficiently develop the monitoring system.

In addition, according to this preferred embodiment, in the monitoring system, the controller part 30 controls data which are held in the model part 10, and the model part 10 is associated with the view part 20 to provide various services for the external apparatuses on the basis of data which are given from the user or the external apparatuses. Therefore, it is possible to reduce the mutual-dependence relation of the respective parts in the monitoring system to localize the modified range in accordance with specification change and extension. Specifically, the change relating to the communication protocol can be carried out by modifying the proxy part 40, and the change relating to the GUI screen can be carried out by modifying the view part 20. In addition, the change relating to data in the monitoring system can be carried out by modifying the model part 10, and the change relating to the services of the monitoring system can be carried out by modifying the controller part 30.

Moreover, according to this preferred embodiment, the proxy part 40 of the monitoring system converts communication data, which are exchanged between the proxy part 40 and the external apparatuses, into the intermediate data format which does not depend on the communication protocol, and the controller part 30 converts the intermediate data into the internal data format which is handled in the monitoring system, so that the model part 10 and the view part 20 handle the internal data which have been converted by the controller part 30. Therefore, the influence of the change of the communication protocol can be localized in the proxy part 40.

In addition, according to this preferred embodiment, the classes of the model part 10, proxy part 40 and controller part 30 are prepared every kind of the external apparatuses which are objects to be monitored, and the classes of the view part 20 are prepared every kind of the screens for interface. Therefore, it is possible to easily cope with addition, deletion and so forth in the external apparatuses, the screens for interface and so forth. In addition, the classes of the model part 10 are prepared every kind data, which are used in the external apparatus, in addition to the kind of the external apparatuses which are object to be monitored, and prepared every kind of the services, which are provided for the external apparatuses, in addition to the external apparatuses which are objects to be monitored. Therefore, it is possible to easily cope with the addition, deletion and so forth of data and services. Moreover, the classes of the controller part 30 are divided into the upper classes, which are prepared every kind of the external apparatuses which are objects to be monitored, and the lower classes which are prepared every kind of the services which are provided for the external apparatuses. Therefore, it is possible to easily cope with the addition, deletion and so forth of the services which are provided for the same external apparatus.

Figure 27:
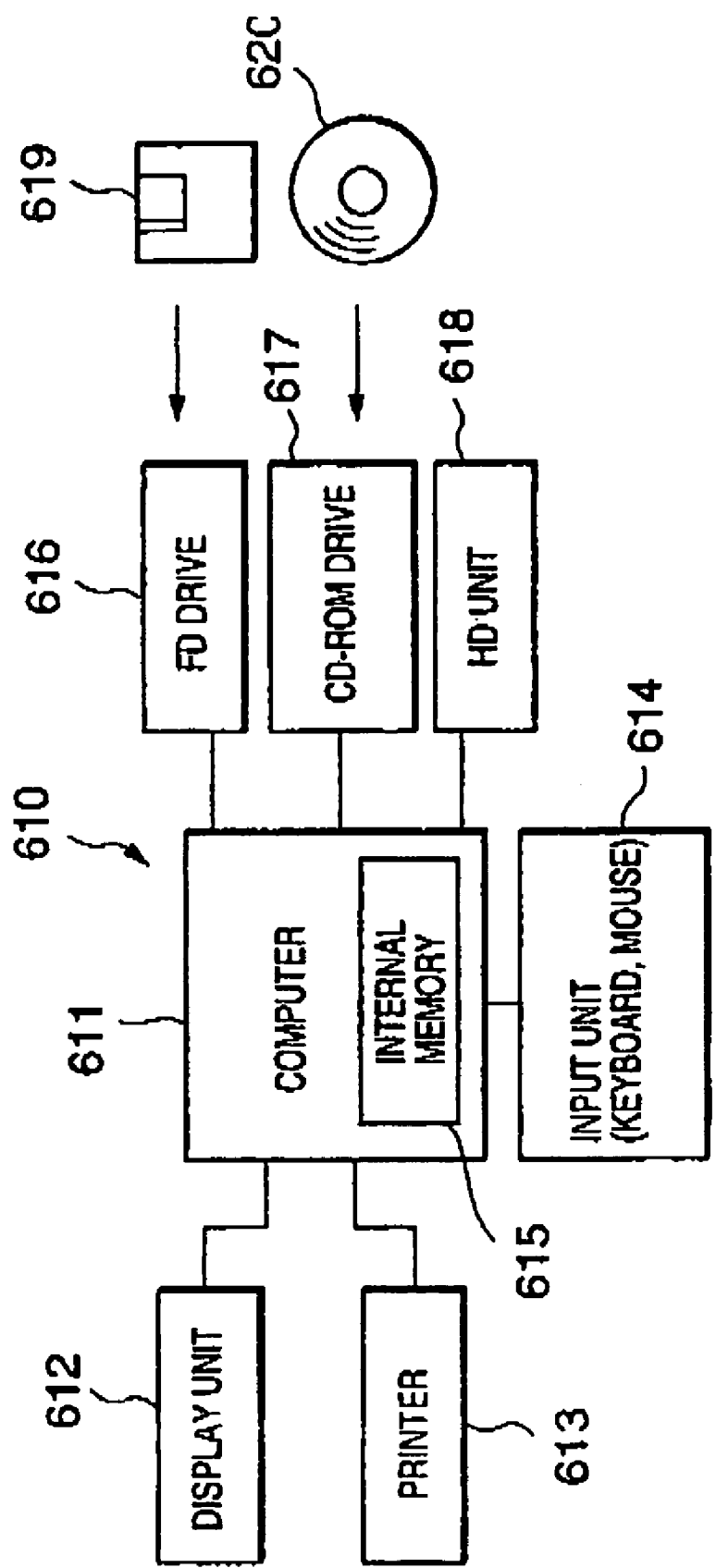
FIG. 27 is a block diagram showing an example of a computer system, to which a method for constructing a monitoring system and a monitoring system according to the present invention are applied.

Furthermore, in the above described preferred embodiment, the monitoring system can be realized on, e.g., a computer system 610 shown in FIG. 27. The computer system 610 comprises a computer body 611 as well as various peripheral apparatuses which include a display unit 612, such as a CRT, a printer 613, an input unit 614, such as a keyboard or a mouse, a FD drive 616, a CD-ROM drive 617 and a hard disk unit 618. The above described program can be stored in a computer readable recording medium, such as an internal memory 615, a hard disk 618, a flexible disk 619 or a CD-ROM 620, on the computer body 611, and sequentially read out of a central processing unit (CPU) on the computer body 611 to be executed to realize the above described functions.

Furthermore, the recording medium according to the present invention may have any one of recording forms as long as it is a recording medium, which can record programs or frameworks and which can be read by a computer, such as a magnetic disk, a floppy disk, a hard disk, an optical disk (a CD-ROM, a CD-R, a DVD or the like), an optical magnetic disk (an MO or the like), or a semiconductor memory. In addition, the recording media include carrier waves transmitted on a network, and information transmitting media.

In addition, an operation system (OS), a data base management software, and a middleware, such as a network software, which operate on a computer on the basis of the instructions of a program installed in the computer from the recording medium, may execute part of each processing for realizing this preferred embodiment.

Moreover, the recording media according to the present invention include media independent of the computer, as well as recording media in which a program or framework transmitted via a LAN or Internet has been downloaded to be stored or temporarily stored.

In addition, the number of the recording media should not be limited to one, but the processing in this preferred embodiment may be executed by a plurality of media which have any construction.

Preferred embodiments of a monitoring system constructed by the above described monitoring system constructing method will be described below.

First Preferred Embodiment

Referring to FIGS. 6 through 10, the first preferred embodiment of a monitoring system according to the present invention will be described below. Furthermore, in this first preferred embodiment, it is supposed that the number of external apparatuses serving as objects to be monitored is one, only one kind of data (setting data) exist as internal data used in the external apparatus, and only a setting screen exists as a CUI screen for displaying the data.

Figure 6:
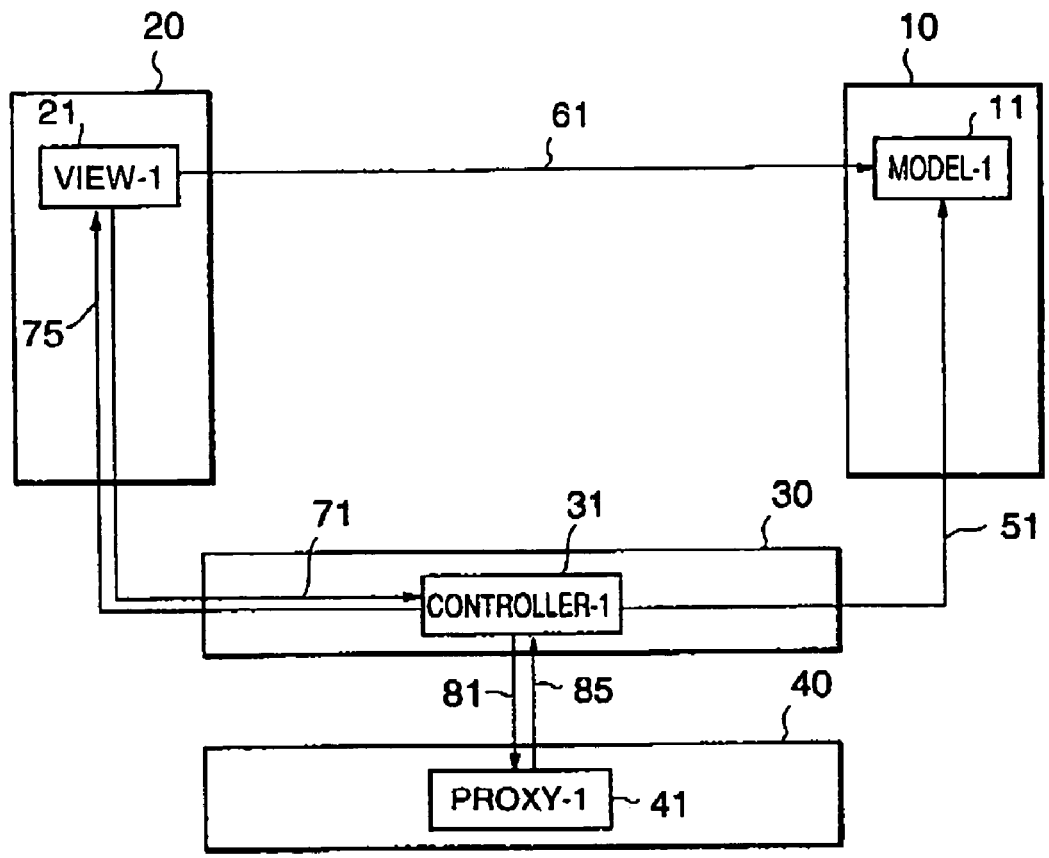
FIG. 6 is a block diagram showing a class structure of a first preferred embodiment of a monitoring system constructed according to the present invention.

FIG. 6 shows a class structure of the first preferred embodiment of a monitoring system according to the present invention.

As shown in FIG. 6, in the monitoring system according to the first preferred embodiment, each of the model part 10, the view part 20, the controller part 30 and the proxy part 40 include a single class. That is, the model part 10 includes a Model-1 class 11 for holding setting data which are used in an external apparatus serving as an object to be monitored. In addition, the view part 20 includes a View-1 class 21 for displaying data of the Model-1 class 11 on the CUI screen. Moreover, the proxy part 40 includes a Proxy-1 class 41 corresponding to the external apparatus serving as the object to be monitored. In addition, the controller part 30 includes a Controller-1 class 31 for providing a setting service for the external apparatus serving as the object to be monitored.

Furthermore, in FIG. 6, the Controller-1 class 31 is associated so as to control (including refer and update) the Model-1 class 11 (association 51). In addition, the View-1 class 21 is associated so as to update and refer to the Model-1 class 11 (association 61). Moreover, the View-1 class 21 is associated with the Controller-1 class 31 so as to exchange data, which are given from the user and the external apparatus, so that the View-1 class 21 gives the Controller-1 class 31 notice of a View event (an event on the GUI screen) (association 71) and so that the Controller-1 class 31 gives the View-1 class 21 notice of a Proxy event (an event from the external apparatus) (association 75). In addition, the Controller-1 class 31 is associated with the Proxy-1 class 41 so as to exchange the setting data of the external apparatus, so that the Controller-1 class 31 gives the Proxy-1 class 41 notice of setting instructions (association 81) and so that the Proxy-1 class 41 gives the Controller-1 class 31 notice of set results (association 85). Furthermore, the Model-1 class 11 is only referred by other classes, and does not utilize any classes.

The operations of the first preferred embodiment of a monitoring system according to the present invention, which is shown in FIG. 6, when the system is started, when the setting service is provided and when the system is stopped, will be described below.

(Starting of System)

Figure 7:
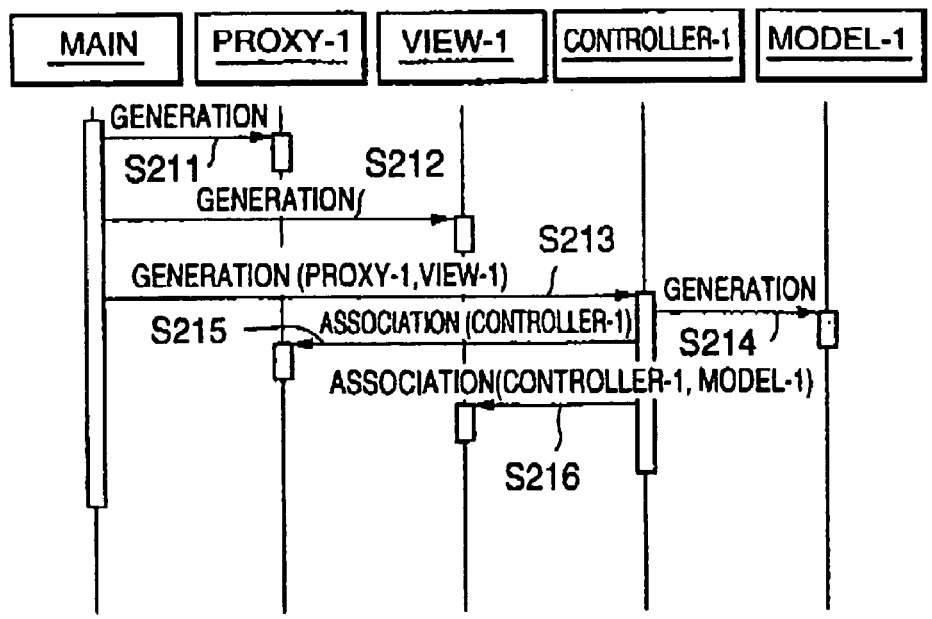
FIG. 7 is a sequence diagram for explaining the operation of the monitoring system of FIG. 6 during the starting of the system.

FIG. 7 is a diagram for explaining the operation of the first preferred embodiment of a monitoring system according to the present invention, which is shown in FIG. 6, during the starting of the system (the operation when objects (substances of classes) are generated). Furthermore, FIG. 7 is a sequence diagram showing the flow of messages between objects. In this figure, objects are expressed by the blocks in the top stage, and the lapse of time is expressed in the direction of axis of ordinates. In addition, the transmission of each message is expressed by an arrow drawn from an object to another object. Furthermore, in FIG. 7, a main routine, which is called when the monitoring system is started, is also expressed as an object for convenience. Furthermore, the sequence diagrams of FIGS. 8 and 9, which will be shown later, are expressed in accordance with the same rule.

First, the main routine generates a Proxy-1 object (step 211). At this time, the Proxy-1 object carries out a connection processing between the external apparatus and the monitoring system to provide a communication enable state between the external apparatus and the monitoring system. Then, the main routine generates a View-1 object (step 212).

Moreover, the main routine generates a Controller-1 object (step 213). At this time, the Controller-1 object receives references of the Proxy-1 object and View-1 object in order to have the association with the Proxy-1 object and the View-1 object. On the other hand, since the Controller-1 object controls the Model-1 object, the Controller-1 object generates a Model-1 object (step 214). Subsequently, the Controller-1 object associates itself with the Proxy-1 object (step 215). Moreover, the Controller-1 object associates itself and the Model-1 object with the View-1 object (step 216).

(Setting Service)

Figure 8:
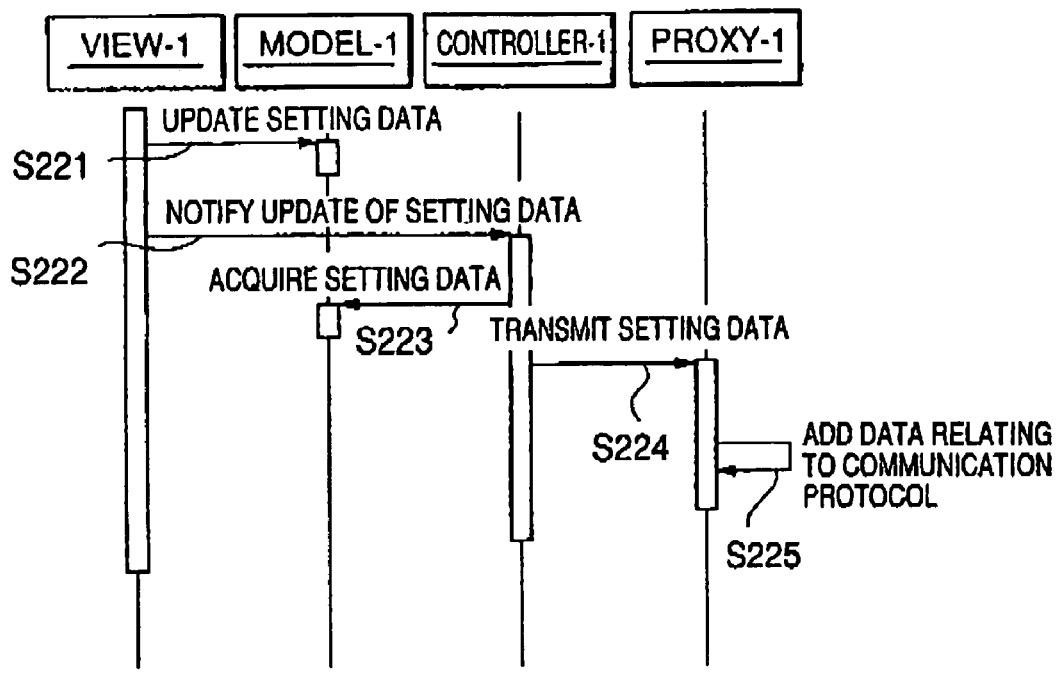
FIG. 8 is a sequence diagram for explaining the operation of the monitoring system of FIG. 6 when a setting service is provided.

FIG. 8 is a sequence diagram for explaining the operation of the first preferred embodiment of a monitoring system according to the present invention, which is shown in FIG. 6, when a setting service is provided (the operation when setting data are changed on the CUI screen to be transmitted to an external apparatus serving as an object to be monitored).

First, the View-1 object updates the setting data of the Model-1 object (step 221), and then, gives the Controller-1 object notice of the update of the setting data (step 222). Then, the Controller-1 object acquires the setting data from the Model-1 object (step 223), and then, transmits the setting data to the Proxy-1 object in the form of intermediate data (step 224). Finally, the Proxy-1 object adds data, which relate to the communication protocol, to the data (the intermediate data) (step 225), and then, transmits the setting data to the external apparatus.

(Stopping of System)

Figure 9:
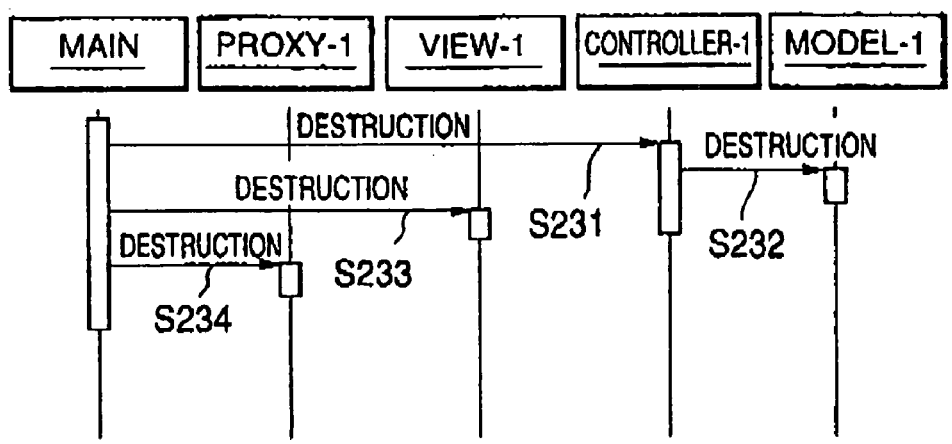
FIG. 9 is a sequence diagram for explaining the operation of the monitoring system of FIG. 6 during the stopping of the system.

FIG. 9 is a sequence diagram for explaining the operation of the first preferred embodiment of a monitoring system according to the present invention, which is shown in FIG. 6, during the stopping of the system (the operation when the objects are destroyed). Furthermore, in this case, the objects are destroyed in the opposite order to that in the production of the objects shown in FIG. 7.

First, the main routines destroys the Controller-1 object (step 231). On the other hand, since the Controller-1 object controls the Model-1 object, the Controller-1 object destroys the Model-1 object (step 232). Then, the main routine destroys the View-1 object (step 233). Moreover, the main routine destroys the Proxy-1 object (step 234). At this time, the Proxy-1 object carries out a connection processing between the external apparatus and the monitoring system to provide a communication stopping state between the external apparatus and the monitoring system.

Figure 10:
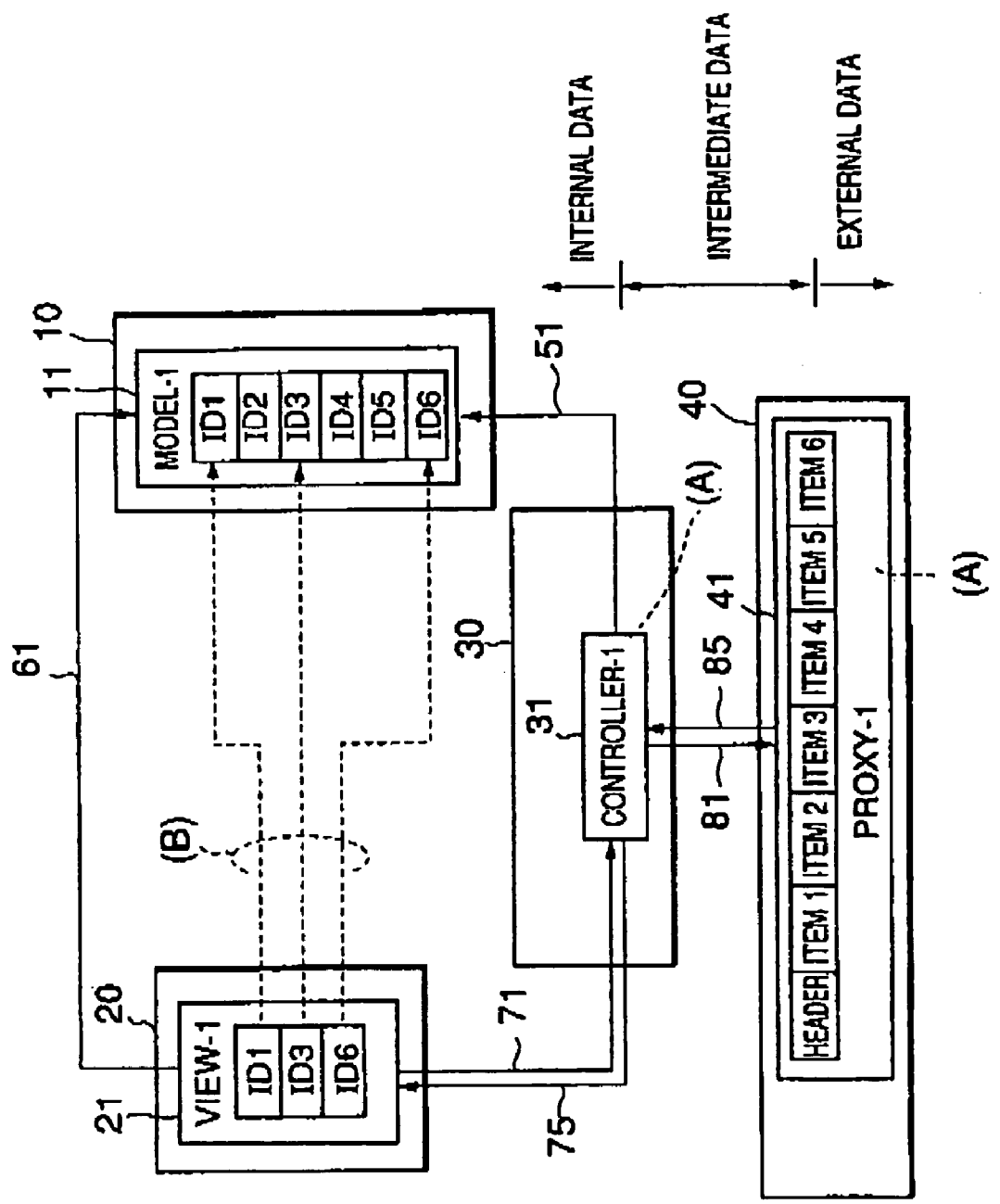
FIG. 10 is a conceptual diagram for explaining the operation and effect of the monitoring system shown in FIG. 6.

FIG. 10 is a conceptual diagram for explaining the operation and effect of the first preferred embodiment of a monitoring system according to the present invention, which is shown in FIG. 6.

As shown in FIG. 10, in the monitoring system according to the first preferred embodiment, the proxy part 40 converts communication data ("Item n" in the figure), which relate to the communication protocol between the monitoring system and the external apparatus, into intermediate data which do not depend on the communication protocol, and the controller part 30 converts the intermediate data into an internal data ("Idn" in the figure) format which is handled in the monitoring system (reference symbol (A)). In addition, the model part 10 is placed as internal data which are handled in the monitoring system, and has a structure wherein both of the view part 20 and the controller part 30 refer to the model part 10 (reference symbol (B)). Therefore, even if the communication protocol between the monitoring system and the external apparatus is changed, it has only to change the proxy part 40, and the change of the communication protocol does not influence the model part 10, the view part 20 and the controller part 30. In addition, the view part 20 can directly refer to data of the model part 10, so that it is not required to copy data in the monitoring system. Moreover, since the view part 20 has only to refer to or update items which are required for the model part 10, the change of displayed items on the GUI screen does not influence the model part 10 even it the displayed items are changed.

Thus, according to the monitoring system in the first preferred embodiment, the influence of the change of the communication protocol can be localized in the proxy part 40, and it is possible to prevent data in the monitoring system from being copied. In addition, it is possible to reduce the dependence between the view part 20 and the model part 10.

Second Preferred Embodiment

Referring to FIGS. 11 through 16, the second preferred embodiment of a monitoring system according to the present invention will be described below. In this second preferred embodiment, a build-up service for an external apparatus is added to the setting service for the external apparatus in the above described first preferred embodiment, and other basic constructions and operations are substantially the same as those in the above described first preferred embodiment. In the second preferred embodiment, the same reference numbers are given to the same portions as those in the first preferred embodiment, and the detailed description thereof is omitted.

Figure 11:
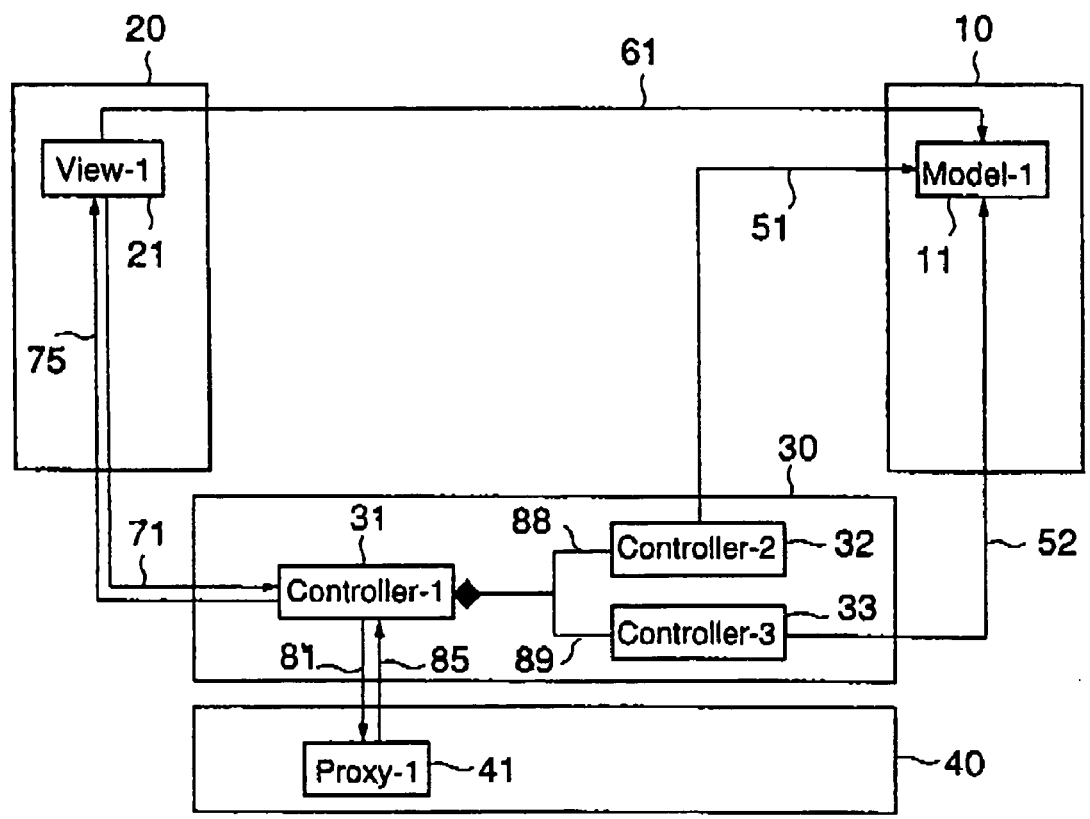
FIG. 11 is a block diagram showing a class structure of a second preferred embodiment of a monitoring system constructed according to the present invention.

FIG. 11 shows a class structure of the second preferred embodiment of a monitoring system according to the present invention.

As shown in FIG. 11, in the monitoring system according to the second preferred embodiment, the controller part 30 includes a Controller-2 class 32 and a Controller-3 class 33 (lower classes) in addition to the Controller-1 class 31 (upper class). The build-up service added in the second preferred embodiment is provided for transmitting required initialization data to the external apparatus as initialization. However, if only the Controller-1 class 31 copes with the build-up service as the above described first preferred embodiment, the service is complicated. Therefore, the Controller-1 class 31 prepared every kind of external apparatuses, which are objects to be monitored, is internally devided to prepare the Controller-2 class 32 for providing a build-up service and the Controller-3 class 33 for providing a setting service. Furthermore, the Controller-1 class 31 does not any concrete services, and exchanges data between the controller-1 class 31 and other classes (the Model-1 class 11 and the View-1 class 21).

Furthermore, in FIG. 11, the View-1 class 21 and the Proxy-1 class 41 are associated so as to exchange data between these classes and the Controller-1 class 31 (associations 71, 75, 81 and 85). In addition, the Controller-1 class 31 is associated so as to internally possess the Controller-2 class 32 and the Controller-3 class 33 (associations 88 and 89). In addition, although the initialization data of the external apparatus are expressed as the Model-1 class 11, this Model-1 class 11 is associated so that the Controller-2 in charge of the setting service refers to the Model-11, since this Model-1 class 11 is placed as setting data after the build-up service is executed (association 51). On the other hand, since the Controller-3 class 33 is in charge of the build-up service for setting the initialization data for the external apparatus, the Controller-3 class 33 is associated so as to refer to the Model-1 class 11 (association 52).

The operations of the second preferred embodiment of a monitoring system according to the present invention, which is shown in FIG. 11, when the system is started, when the setting service is provided, when and build-up service is provided and when the system is stopped, will be described below.

(Starting of System)

Figure 12:
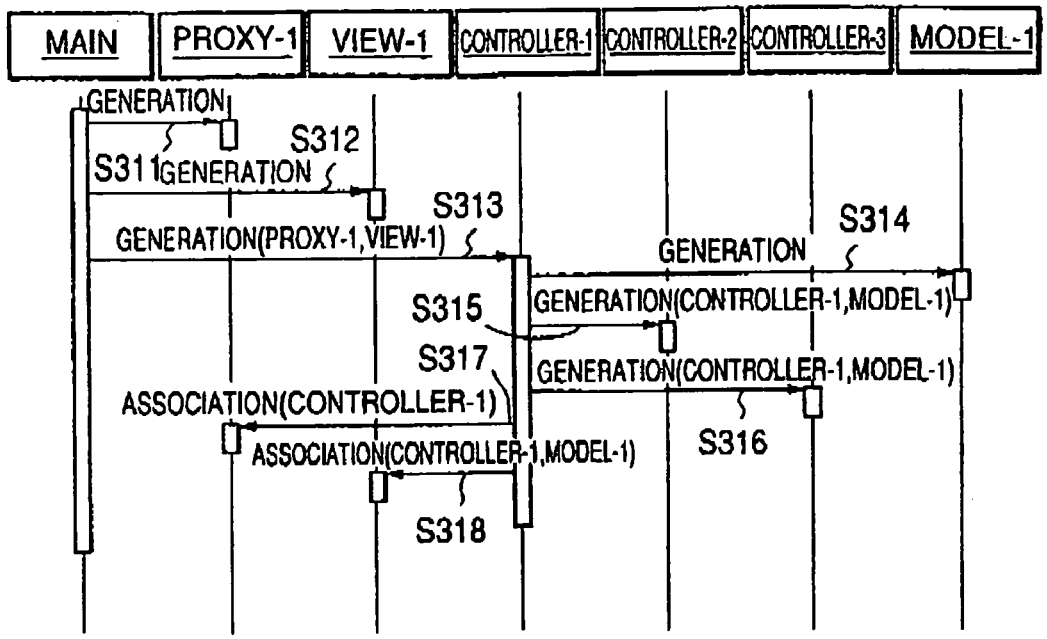
FIG. 12 is a sequence diagram for explaining the operation of the monitoring system of FIG. 11 during the starting of the system.

FIG. 12 is a diagram for explaining the operation of the second preferred embodiment of a monitoring system according to the present invention, which is shown in FIG. 11, during the starting of the system (the operation when objects (substances of classes) are generated).

As shown in FIG. 12, the same sequence as that in the first preferred embodiment shown in FIG. 7 is carried out until the Proxy-1 object, the View-1 object, the Controller-1 object and the Model-1 object are produced (steps 311 through 314). Thereafter, the Controller-1 object sequentially generates the Controller-2 object and Controller-3 object which are internally possessed by the Controller-1 object itself (steps 315 and 316). At this time, the Controller-2 object and the Controller-3 object receive references of the Controller-1 object and Model-1 object in order to have the association with the Controller-1 object and the Model-1 object. Furthermore, the subsequent associations of the Controller-1 object with the Proxy-1 object and View-1 object are carried out by the same sequence as that in the first preferred embodiment shown in FIG. 7 (steps 317 and 318).

(Setting Service)

Figure 13:
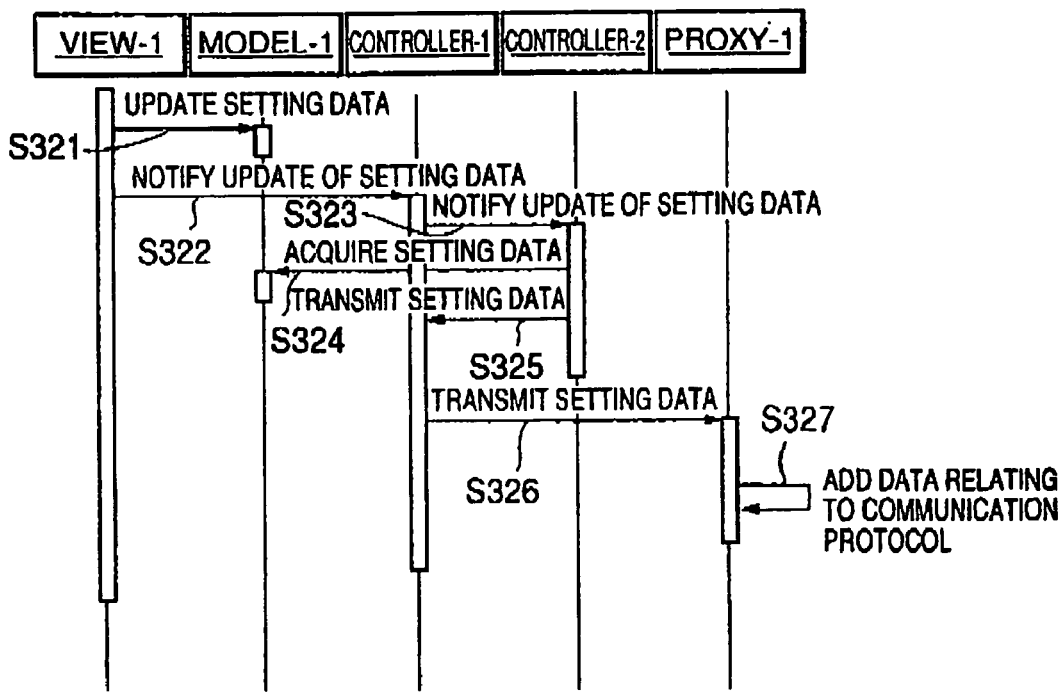
FIG. 13 is a sequence diagram for explaining the operation of the monitoring system of FIG. 11 when a setting service is provided.

FIG. 13 is a sequence diagram for explaining the operation of the second preferred embodiment of a monitoring system according to the present invention, which is shown in FIG. 11, when a setting service is provided (the operation when setting data are changed on the CUI screen to be transmitted to an external apparatus serving as an object to be monitored).

As shown in FIG. 13, the steps until the View-1 object updates the Model-1 object to give the Controller-1 object notice of the update are carried out by the same sequence as that in the first preferred embodiment shown in FIG. 8 (steps 321 and 322. Thereafter, the Controller-1 object directly transmits the notice of update, which has been received from the View-1 object, to the Controller-2 object, by which the setting service is actually carried out (step 323). Then, the Controller-2 object acquires the setting data from the Model-1 object (step 324). Then, the Controller-2 object transmits the setting data to the Controller-1 object in the form of intermediate data in order to transit the setting data to the Proxy-1 object in the form of the intermediate data (step 325). Furthermore, the subsequent transmission of the setting data to the Proxy-1 object by the Controller-1 object, and the subsequent addition of data relating to the communication protocol by the Proxy-1 object are carried out by the same sequence as that in the first preferred embodiment shown in FIG. 8 (steps 326 and 327).

(Build-Up Service)

Figure 14:
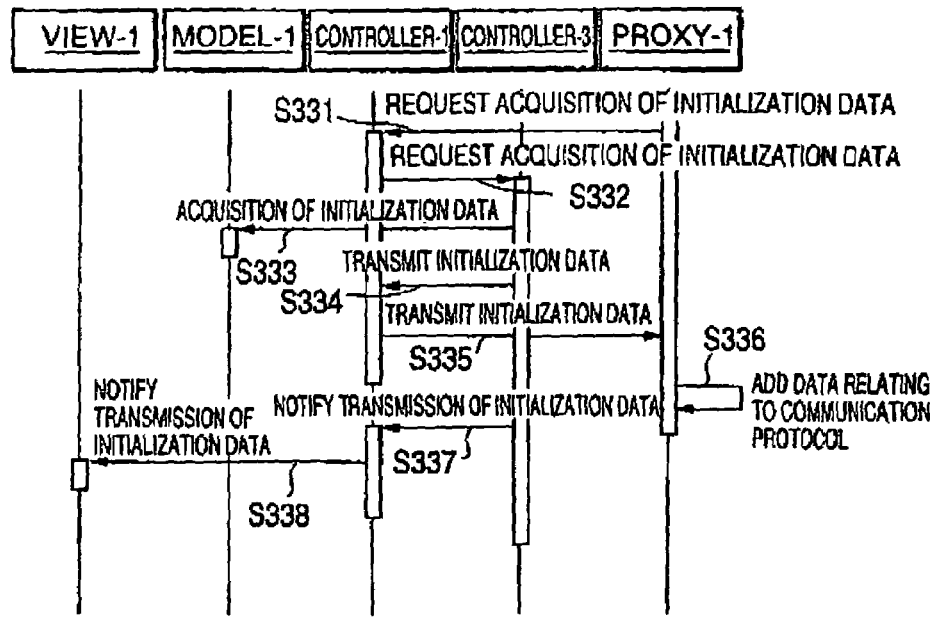
FIG. 14 is a sequence diagram for explaining the operation of the monitoring system of FIG. 11 when a build-up service is provided.

FIG. 14 is a sequence diagram for explaining the operation of the second preferred embodiment of a monitoring system according to the present invention, which is shown in FIG. 11, when a build-up service is provided (the operation when initialization data are transmitted to the external apparatus to display the completion of the sequence on the GUI screen).

First, the Proxy-1 object monitors the status of the external apparatus which is the object to be monitored, and requests of the Controller-1 object that it acquires the initialization data when the external apparatus is built up (step 331). Then, the Controller-1 object directly transmits the request of the transmission, which has been received from the Proxy-1 object, to the Controller-3 object, by which the build-up service is actually carried out (step 332). Then, the Controller-3 object acquires the initialization data from the Model-1 object (step 333). Then, the Controller-3 object transmits the initialization data to the Controller-1 object in order to transmit the initialization data to the Proxy-1 object (step 334). Then, the Controller-1 object transmits the initialization data to the Proxy-1 object in the form of intermediate data (step 335). Thereafter, the Proxy-1 object adds data, which relate to the communication protocol, to the initialization data (the intermediate data) (step 336). Then, the Controller-3 object gives the Controller-1 object notice of the transmission of the initialization data in order to give the View-1 object notice that the initialization data have been transmitted (step 337). Then, the Controller-1 object gives the View-1 object of the transmission of the initialization data (step 338).

(Stopping of System)

Figure 15:
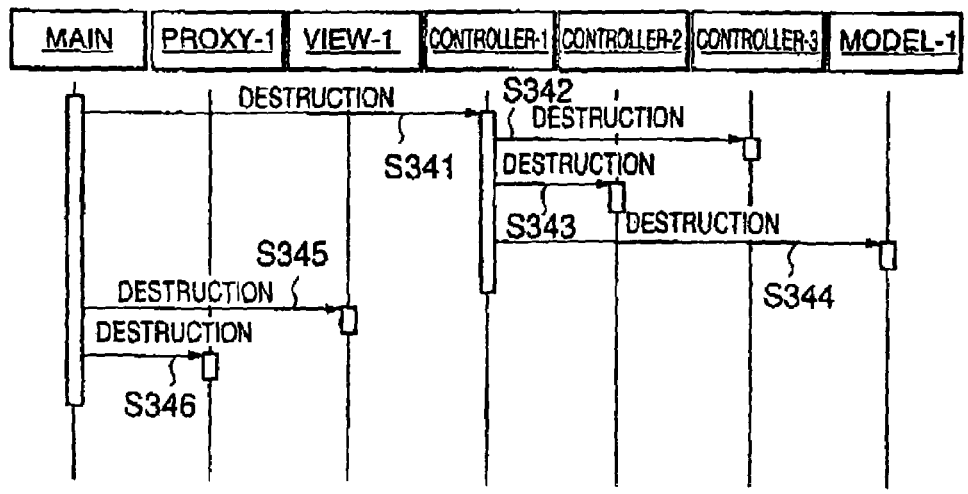
FIG. 15 is a sequence diagram for explaining the operation of the monitoring system of FIG. 11 during the stopping of the system.

FIG. 15 is a sequence diagram for explaining the operation of the second preferred embodiment of a monitoring system according to the present invention, which is shown in FIG. 11, during the stopping of the system (the operation when the objects are destroyed).

As shown in FIG. 15, although the Controller-1 object, the Model-1 object, the View-1 object and the Proxy-1 object are basically destroyed by the same sequence as that in the first preferred embodiment shown in FIG. 9 (steps 341, 344, 345 and 346), the Controller-1 object sequentially destroys the Controller-3 object and the Controller-2 object (steps 342 and 343) after the main routine destroys the Controller-1 object (step 341) in this second preferred embodiment.

Figure 16:
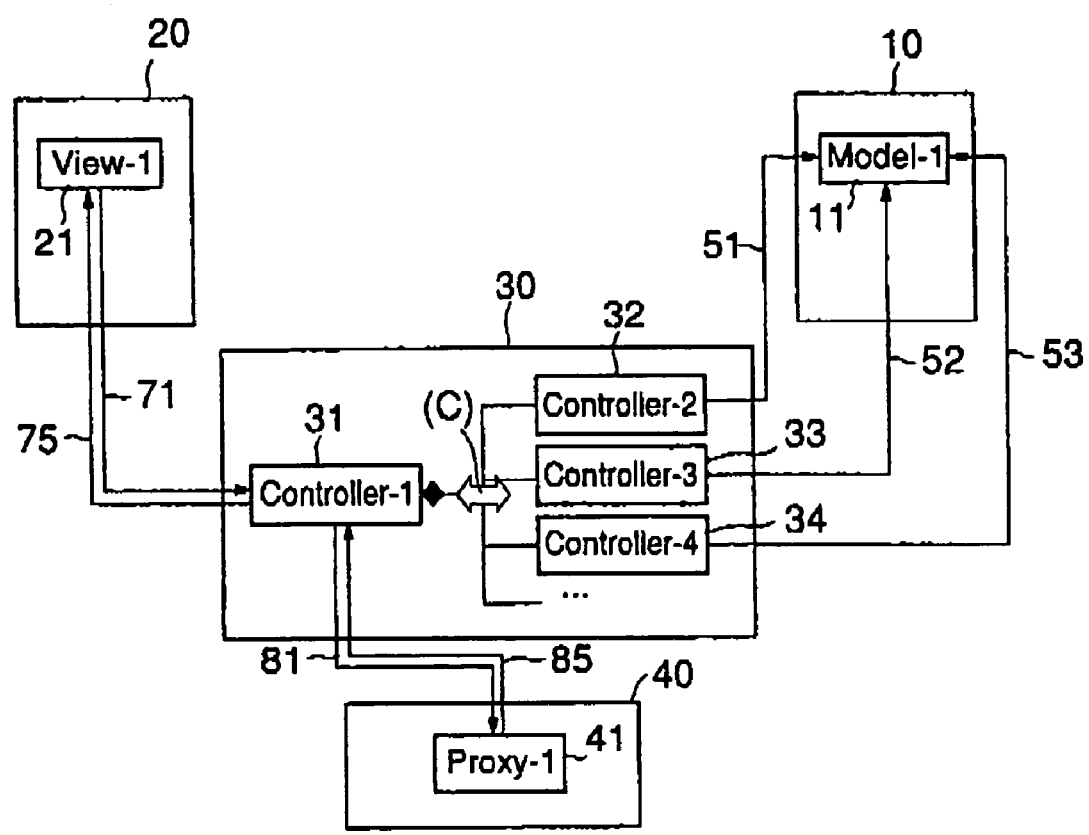
FIG. 16 is a conceptual diagram for explaining the operation and effect of the monitoring system shown in FIG. 11.

FIG. 16 is a conceptual diagram for explaining the operation and effect of the second preferred embodiment of a monitoring system according to the present invention, which is shown in FIG. 11.

As shown in FIG. 16, in the monitoring system according to the second preferred embodiment, the view part 20 and the proxy part 40 exchange data between these parts and the Controller-1 class of the controller part 30, and services are actually carried out by the Controller-2 class 32 and Controller-3 class 33 which are internally possessed by the Controller-1 class 31 (reference number (C)). Therefore, even if a new service is intended to be added to the same external apparatus, it is possible to easily cope therewith by adding and deleting Controller classes in accordance with the service.

Third Preferred Embodiment

Referring to FIGS. 17 through 21, the third preferred embodiment of a monitoring system according to the present invention will be described below. In this third preferred embodiment, status data are added as internal data to the setting data in the above described first preferred embodiment, and a status displaying screen is added to the setting screen in the above described first preferred embodiment as the GUI screen for displaying these data. Other basic constructions and operations are substantially the same as those in the above described first preferred embodiment. In the third preferred embodiment, the same reference numbers are given to the same portions as those in the first preferred embodiment, and the detailed description thereof is omitted.

Figure 17:
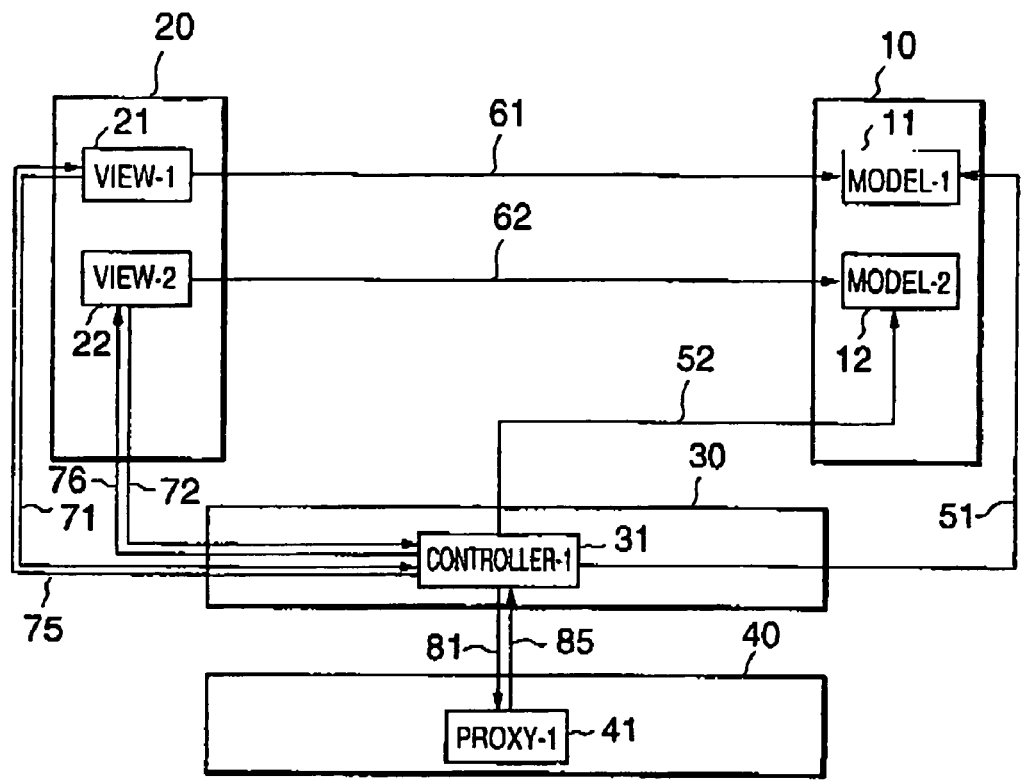
FIG. 17 is a block diagram showing a class structure of a third preferred embodiment of a monitoring system constructed according to the present invention.

FIG. 17 shows a class structure of the third preferred embodiment of a monitoring system according to the present invention.

As shown in FIG. 17, in the monitoring system according to the third preferred embodiment, the model part 10 newly includes a Model-2 class 12 for holding the status data of the external apparatus, and the View part 20 newly includes a View-2 class 22 for displaying data of the Model-2 class 12 on the status displaying screen.

Furthermore, in FIG. 17, the status data of the external apparatus are placed as a different kind of data from the setting data for the same external apparatus, and the Controller-1 class 31 and the Model-2 class 12 are associated so that the Controller-1 class 31 refers to the Model-2 class 12 (association 52). In addition, since it is required to display the status data of the external apparatus on the GUI screen, the View-2 class 22 and the Model-2 class 12 are associated so that the View-2 class refers to the Model-2 class 12 (association 62). Furthermore, although the status data and the setting data are displayed on different GUI screens, the external apparatus as an object is the same apparatus. In addition, in order to check whether the setting data and the status data contradict each other and in order to display the results on the GUI screen, the setting service and the status displaying service are realized by the same Controller-1 class 31. The View-2 class 22 and the Controller-1 class 31 are associated so as to exchange data therebetween (associations 72 and 76).

The operations of the third preferred embodiment of a monitoring system according to the present invention, which is shown in FIG. 17, when the system is started, when the status displaying service is provided and when the system is stopped, will be described below. Furthermore, since the operation when the setting service is provided is the same as that in the above described first preferred embodiment, the description thereof is omitted.

(Starting of System)

Figure 18:
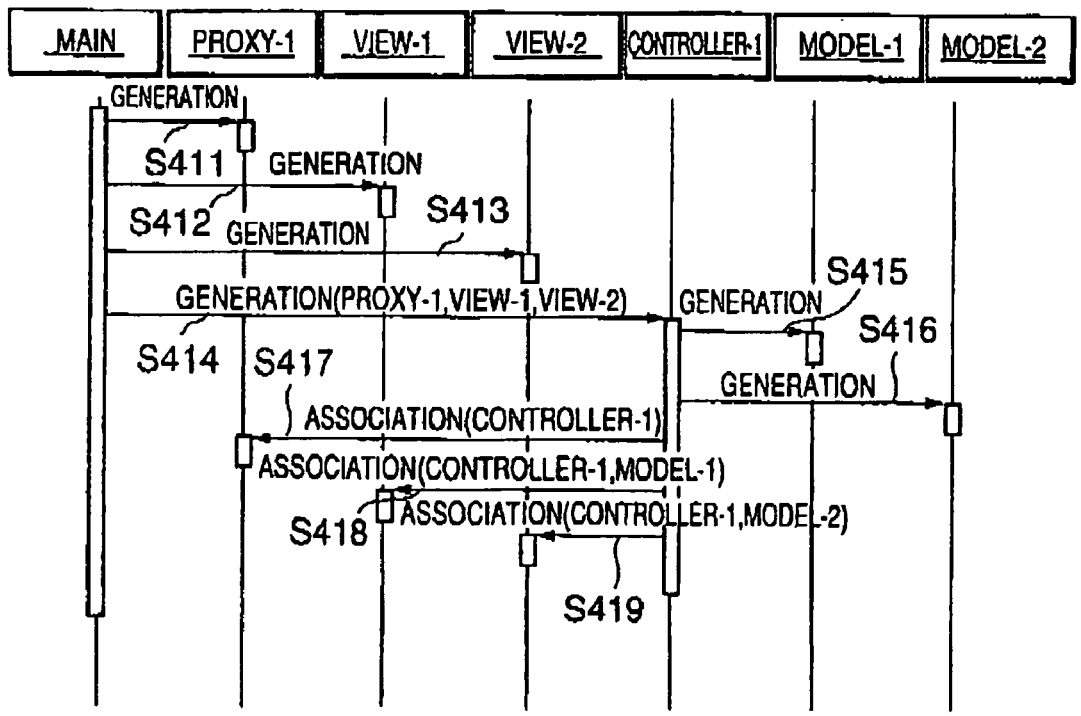
FIG. 18 is a sequence diagram for explaining the operation of the monitoring system of FIG. 17 during the starting of the system.

FIG. 18 is a sequence diagram for explaining the operation of the third preferred embodiment of a monitoring system according to the present invention, which is shown in FIG. 17, during the starting of the system (the operation when objects (substances of classes) are generated).

As shown in FIG. 18, the same sequence as that in the first preferred embodiment shown in FIG. 7 is carried out until the Proxy-1 object and the View-1 object are produced (steps 411 and 412). Then, the main routine generates the View-2 object (step 413). Moreover, the main routine generates the Controller-1 object (step 414). At this time, the Controller-1 object receives references of the Proxy-1 object, View-1 object and View-2 object in order to have the association with these objects. Then, the Controller-1 object sequentially generates the Model-1 object and Model-2 object which are controlled by the Controller-1 object itself (steps 415 and 416). Furthermore, the subsequent associations of the Controller-1 object with the Proxy-1 object and View-1 object are carried out by the same sequence as that in the first preferred embodiment shown in FIG. 7 (steps 417 and 418). Finally, the Controller-1 object associates itself and the Model-2 object with the Controller-1 object (step 419).

(Status Displaying Service)

Figure 19:
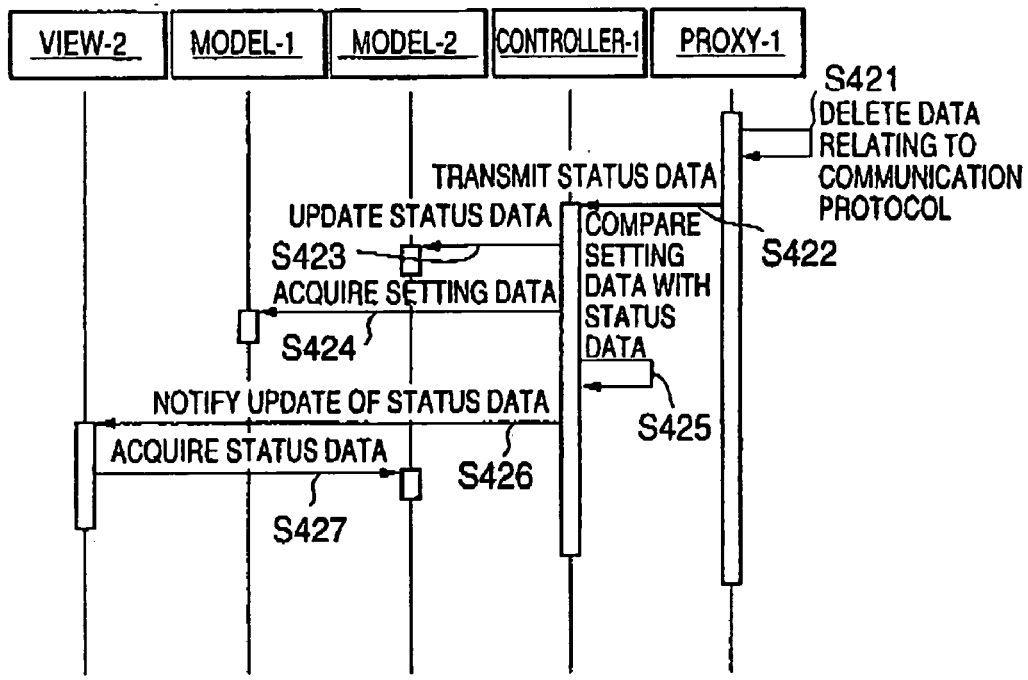
FIG. 19 is a sequence diagram for explaining the operation of the monitoring system of FIG. 17 when a status indicating service is provided.

FIG. 19 is a sequence diagram for explaining the operation of the third preferred embodiment of a monitoring system according to the present invention, which is shown in FIG. 17, when a status displaying service is provided (the operation when the status of the external apparatus is displayed after the setting data are changed on the GUI screen and after the setting of the external apparatus is changed by the setting service).

First, the Proxy-1 object receives status data of the external apparatus serving as an object to be monitored, and deletes data, which relate to the communication protocol, from the status data (step 412). Then, the Proxy-1 object transmits the status data to the Controller-1 object in the form of intermediate data (step 422). Then, the Controller-1 object updates the status data of the Model-2 object on the basis of the intermediate data (step 423). Moreover, the Controller-1 object acquires the setting data from the Model-1 object (step 424). Then, the Controller-1 compares the setting data with the status data to check whether both contradict each other (step 425). At this time, if the setting data and the status data are coincident with each other, this means that the setting has not effectively carried out. The case where both data are coincident with each other will be herein described. Then, the Controller-1 object gives the View-2 object notice of the update of the status data (step 426). Finally, the View-2 object acquires status data from the Model-2 object (step 427) to display the status data on the GUI screen.

(Stopping of System)

Figure 20:
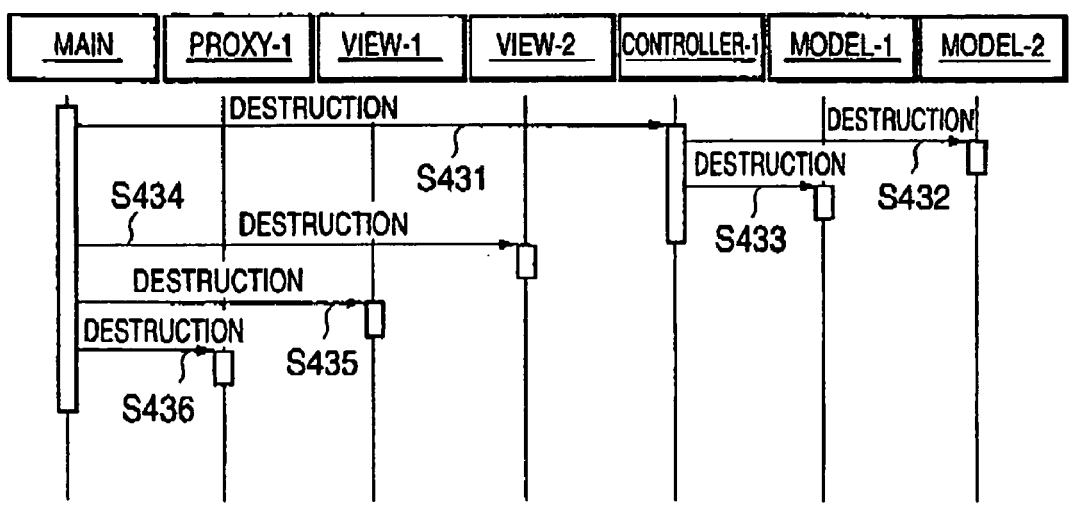
FIG. 20 is a sequence diagram for explaining the operation of the monitoring system of FIG. 17 during the stopping of the system.

FIG. 20 is a sequence diagram for explaining the operation of the third preferred embodiment of a monitoring system according to the present invention, which is shown in FIG. 17, during the stopping of the system (the operation when the objects are destroyed).

As shown in FIG. 20, although the Controller-1 object and the Proxy-1 object are basically destroyed by the same sequence as that in the first preferred embodiment shown in FIG. 9 (steps 431 and 436), the Controller-1 object sequentially destroys the Model-2 object and the Model-1 object (steps 432 and 433) after the main routine destroys the Controller-1 object (step 431) in this third preferred embodiment. In addition, the main routine sequentially destroys the View-2 object and the View-1 object (steps 434 and 435).

Figure 21:
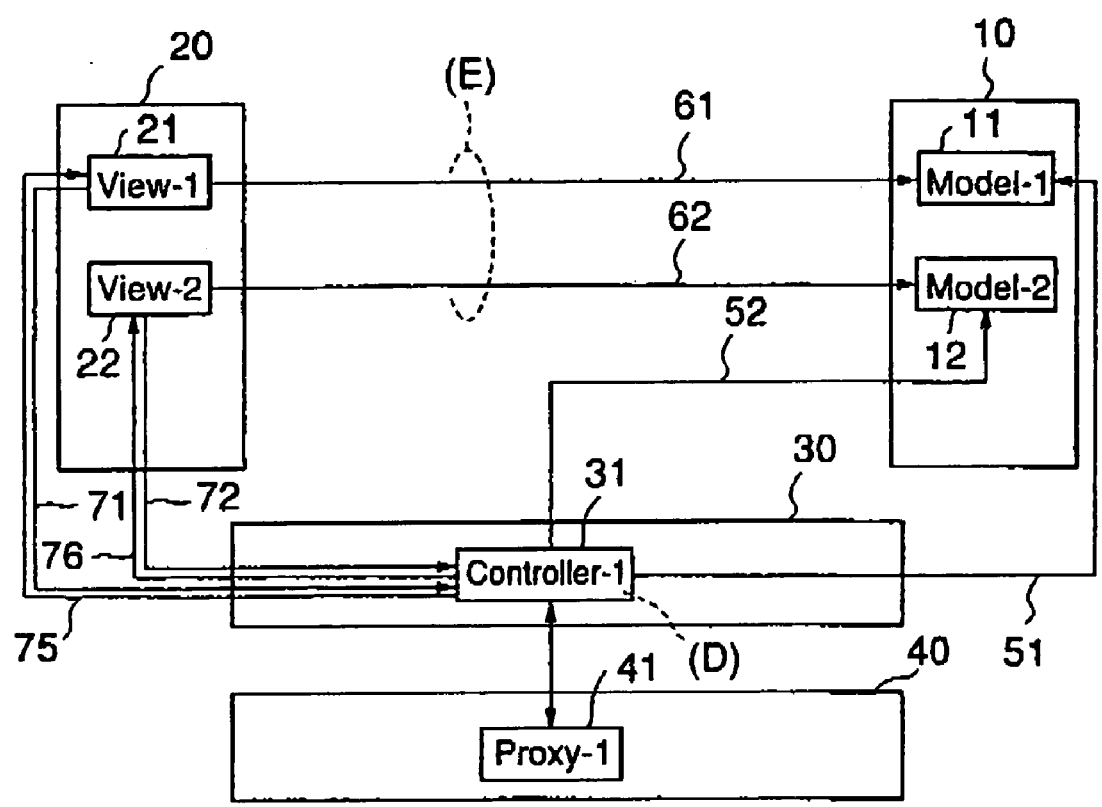
FIG. 21 is a conceptual diagram for explaining the operation and effect of the monitoring system shown in FIG. 17.

FIG. 21 is a conceptual diagram for explaining the operation and effect of the third preferred embodiment of a monitoring system according to the present invention, which is shown in FIG. 17.

As shown in FIG. 21, in the monitoring system according to the third preferred embodiment, the model part 10 is separated from the controller part 30 for controlling the model part 10, and data of the model part 10 is controlled by the controller part 30 (reference symbol (D)). Therefore, even if data handled in the monitoring system are added to or deleted from the model part 10, it is possible to easily determine how data are handled in the services provided by the monitoring system.

In addition, the view part 20 can refer to the model part 10 independently of the relationship between the controller part 30 and the model part 10 (reference symbol (E)). Therefore, even if the GUI screen is added and deleted in accordance with the addition and deletion of data, it is possible to easily cope therewith by adding and deleting the View class.

Fourth Preferred Embodiment

Referring to FIGS. 22 through 26, the fourth preferred embodiment of a monitoring system according to the present invention will be described below. In this fourth preferred embodiment, the same advanced external apparatus is functionally added to the existing external apparatus in the above described first preferred embodiment, and other basic constructions and operations are substantially the same as those in the above described first preferred embodiment. In the fourth preferred embodiment, the same reference numbers are given to the same portions as those in the first preferred embodiment, and the detailed description thereof is omitted.

Figure 22:
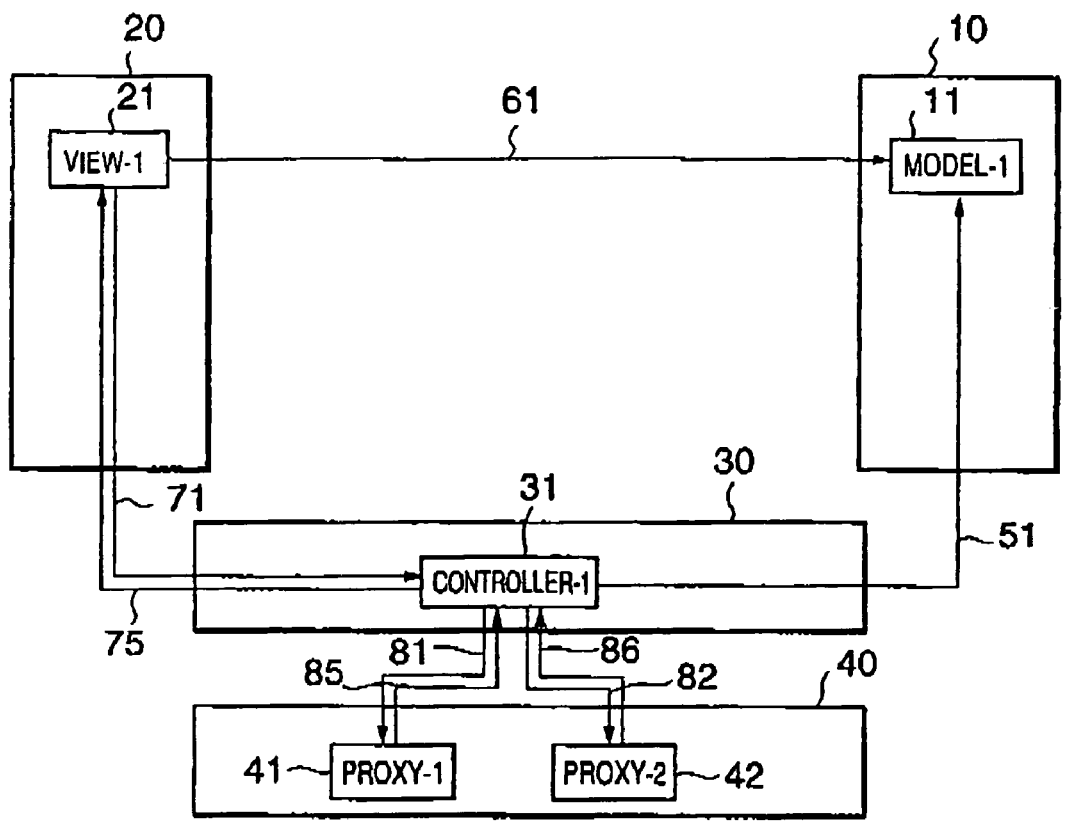
FIG. 22 is a block diagram showing a class structure of a fourth preferred embodiment of a monitoring system constructed according to the present invention.

FIG. 22 shows a class structure of the fourth preferred embodiment of a monitoring system according to the present invention.

As shown in FIG. 22, in the monitoring system according to the fourth preferred embodiment, the proxy part 40 includes a Proxy-2 class 42 for communicating with the advanced external apparatus, in addition to the Proxy-1 class 41 for communicating with the old style external apparatus. Since the advanced external apparatus has the same function as that of the old style external apparatus, any new Controller classes other than the Controller-1 class 31 are not added. Furthermore, the difference between the Proxy-1 class 41 corresponding to the old style external apparatus and the Proxy-2 class 42 corresponding to the advanced external apparatus is only the communication protocol.

Furthermore, in FIG. 22, the Controller-1 class 31 is associated with each of the Proxy-1 class 41 and the Proxy-2 class 42 (associations 81, 82, 85 and 86). Because the monitoring system must similarly provide services for the old style and advanced external apparatuses. Furthermore, the associations between the Model-1 class 11, the View-1 class 21 and the Controller-1 31 are the same as those in the first preferred embodiment shown in FIG. 6.

The operations of the fourth preferred embodiment of a monitoring system according to the present invention, which is shown in FIG. 22, when the system is started, when a setting service is provided and when the system is stopped, will be described below.

(Starting of System)

Figure 23:
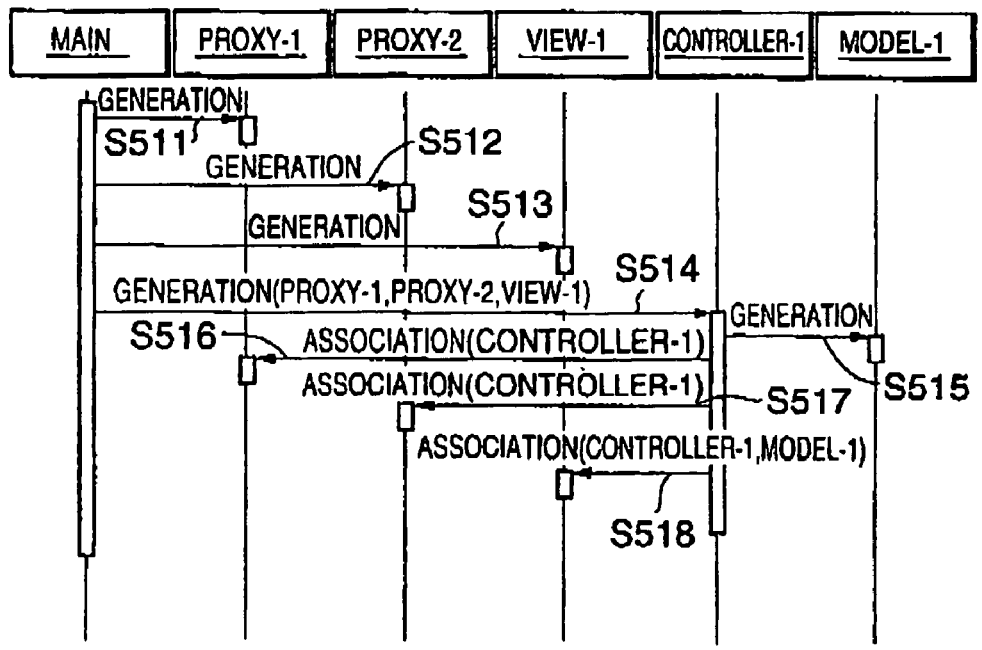
FIG. 23 is a sequence diagram for explaining the operation of the monitoring system of FIG. 22 during the starting of the system.

FIG. 23 is a sequence diagram for explaining the operation of the fourth preferred embodiment of a monitoring system according to the present invention, which is shown in FIG. 22, during the starting of the system (the operation when objects (substances of classes) are generated).

As shown in FIG. 23, first, the main routine generates a Proxy-1 object (step 511), and then, generates a Proxy-2 object (step 512). Thereafter, the same sequence as that in the first preferred embodiment shown in FIG. 7 is carried out until a View-1 object, a Controller-1 object and a Model-1 object are generated (steps 513 through 515). At this time, the Controller-1 object receives references of the Proxy-1 object, Proxy-2 object and View-1 object in order to have the associations with the Proxy-1 object, the Proxy-2 object and the View-1 object. Then, the Controller-1 object associates itself with the Proxy-1 object and the Proxy-2 object (steps 516 and 517). Furthermore, the subsequent association of the Controller-1 object with the View-1 object is carried out simultaneously with the sequence in the first preferred embodiment shown in FIG. 7 (step 518).

(Setting Service)

Figure 24:
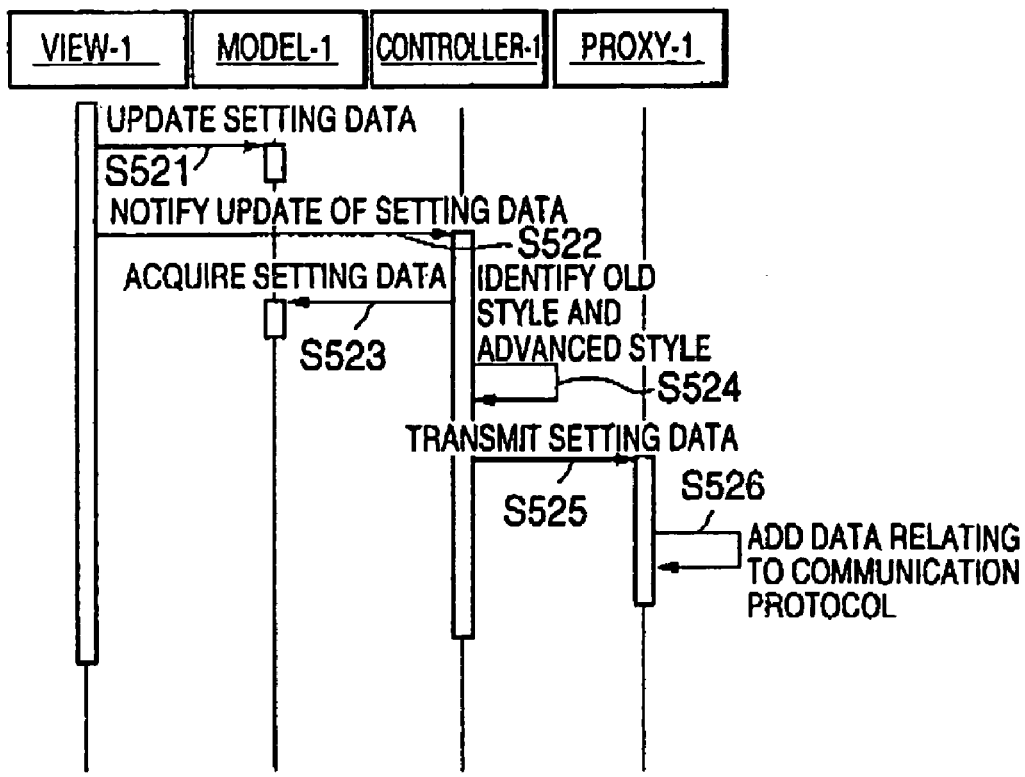
FIG. 24 is a sequence diagram for explaining the operation of the monitoring system of FIG. 22 when a setting service is provided.

FIG. 24 is a sequence diagram for explaining the operation of the monitoring system of FIG. 22 when a setting service is provided (the operation when setting data are changed on the CUI screen to be transmitted to an external apparatus serving as an object to be monitored).

As shown in FIG. 24, the same sequence as that in the first preferred embodiment shown in FIG. 8 is carried out until the View-1 object updates the setting data of the Model-1 object, gives the Controller-1 object notice of the update, and acquires the setting data from the Model-1 object (steps 521 through 523) Then, it is identified whether the external apparatus, to which the setting data are transmitted, is an old style or advanced external apparatus (step 524). Furthermore, it is assumed that data for identification are included in the setting data. Assuming that the external apparatus, to which the setting data are transmitted, is an advanced external apparatus, the Controller-1 object transmits the setting data to the Proxy-2 object in the form of intermediate data (step 525). Finally, the Proxy-2 object adds data, which relate to the communication protocol, to the setting data (the intermediate data) (step 526), and then, transmits the setting data to the advanced external apparatus.

(Stopping of System)

Figure 25:
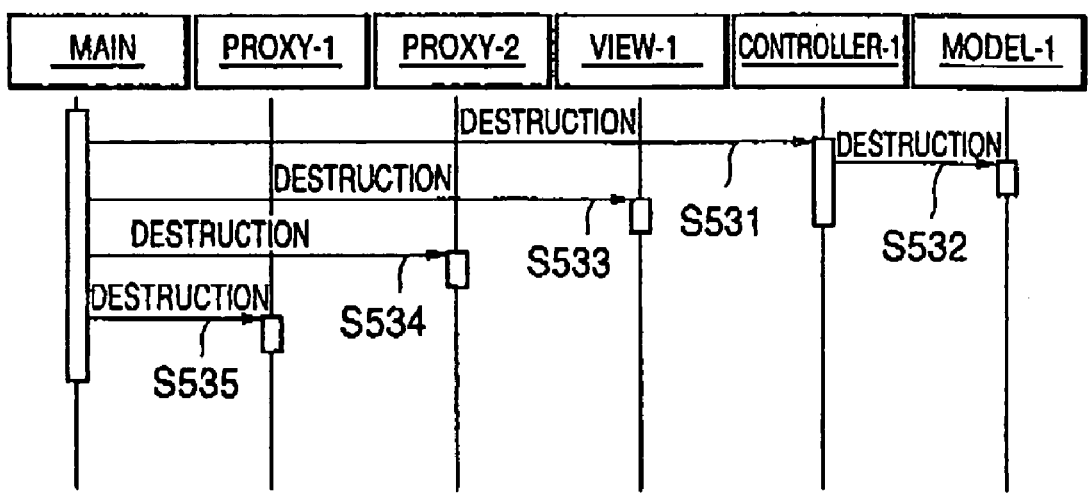
FIG. 25 is a sequence diagram for explaining the operation of the monitoring system of FIG. 22 during the stopping of the system.

FIG. 25 is a sequence diagram for explaining the operation of the monitoring system of FIG. 22 during the stopping of the system (the operation when the objects are destroyed).

As shown in FIG. 25, although the Controller-1 object, the Model-1 object and the View-1 object are basically destroyed by the same sequence as that in the first preferred embodiment shown in FIG. 9 (steps 531 through 534), the main routine sequentially destroys the Model-2 object and the Model-1 object (steps 534 and 535) after destroying the View-1 object (step 533) in the fourth preferred embodiment.

Figure 26:
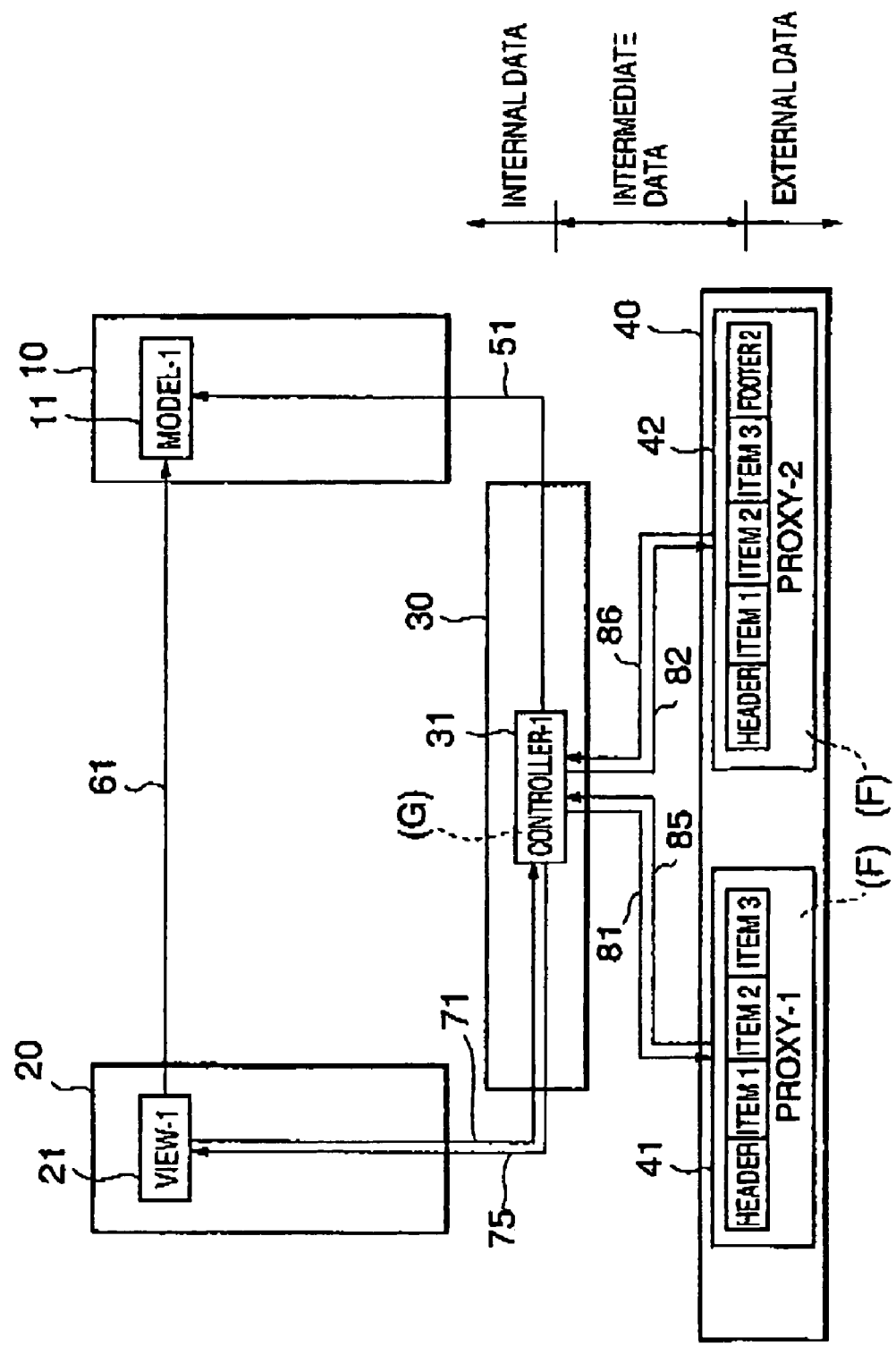
FIG. 26 is a conceptual diagram for explaining the operation and effect of the monitoring system shown in FIG. 22.

FIG. 26 is a conceptual diagram for explaining the operation and effect of the monitoring system shown in FIG. 22.

As shown in FIG. 26, in the monitoring system according to the fourth preferred embodiment, the control part 30 and the proxy part 40 are separated from each other, and the proxy part 40 converts the communication data format in accordance with the communication protocol (reference symbol (F)). In addition, the controller part 30 determines which class of the proxy part 40 data are transmitted to (reference symbol (G)). Therefore, even if the communication protocol of the external apparatus serving as an object to be monitored is changed, it is possible to easily cope therewith by changing the proxy part 40, and the change of the communication protocol does not influence the model part 10, the view part 20 and the controller part 30.

Figure 29:
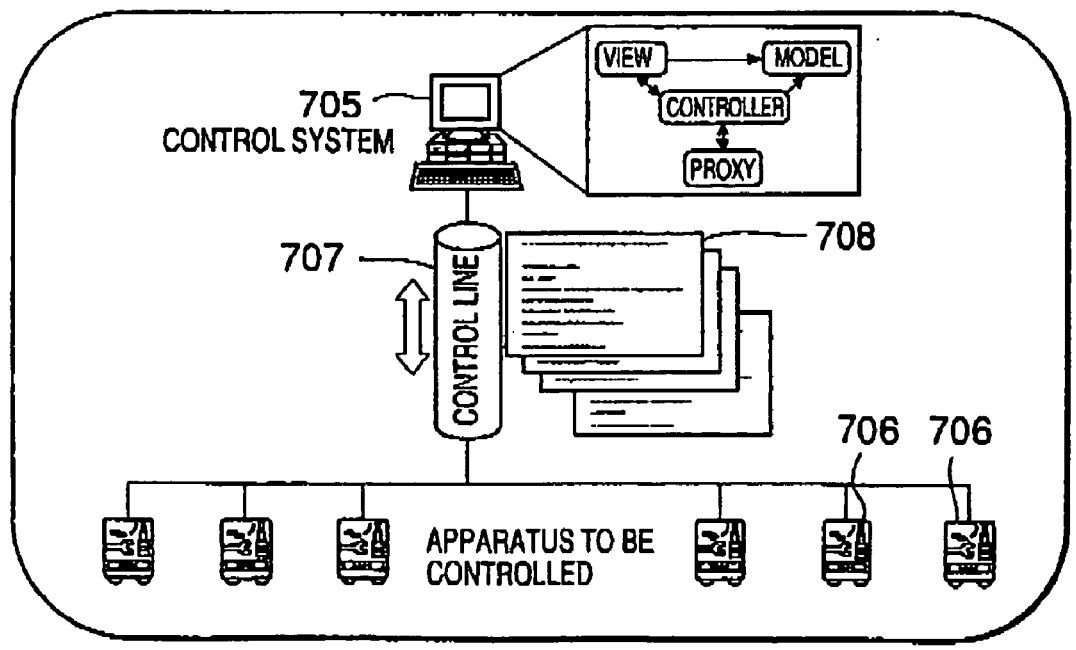
FIG. 29 is a schematic diagram showing an example of a control system (a service providing system) according to the present invention.
Figure 30:
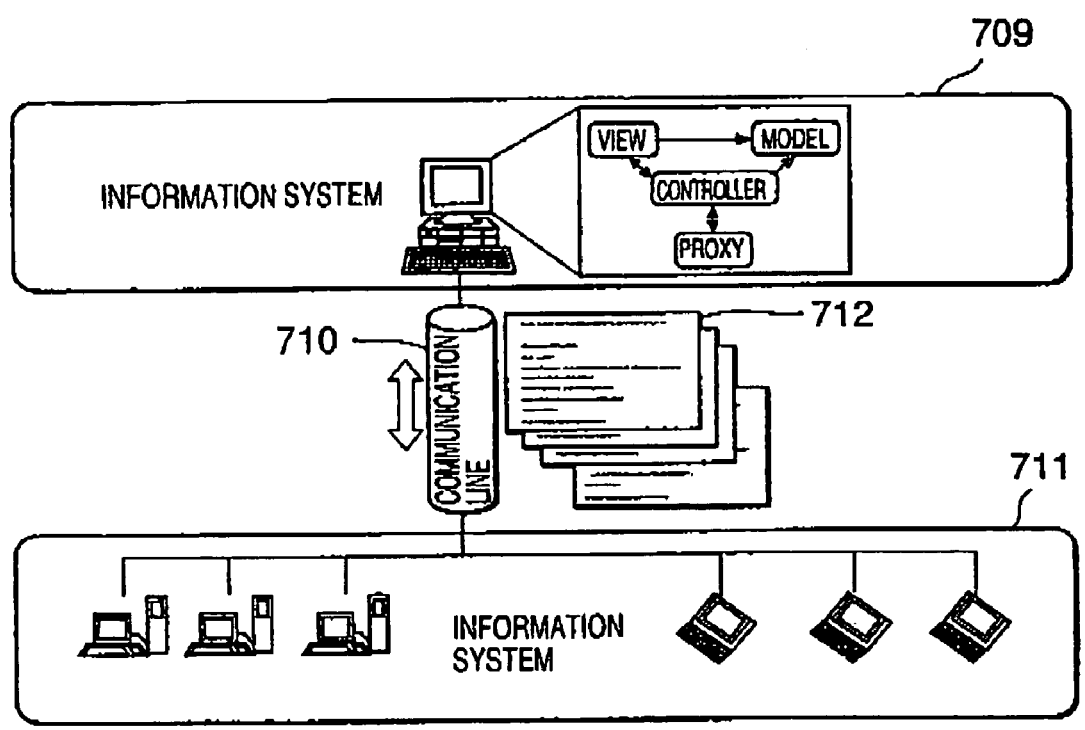
FIG. 30 is a schematic diagram showing an example of an information system (a service providing system) according to the present invention.

Furthermore, while the monitoring system for monitoring the external apparatus (the object system) has been described as an example of a service providing system in the above described preferred embodiments, the present invention should not be limited thereto, but the invention may be applied to (1) a control system for controlling an apparatus to be monitored (an object system) (see FIG. 29), and (2) an information system for exchanging information between the information system and another information system (an object system) (see FIG. 30). Furthermore, the control systems include optical systems from domestic electrification control systems, such as air conditioners or televisions, to large scale control systems, such as plant control systems. In addition, the information systems include optional systems, such as material procurement systems, pay management systems and customer information systems.

As shown in FIG. 29, a control system 705 is housed in the same housing as that of a controlled apparatus 706 to be controlled. The control system 705 is connected to the controlled apparatus 706 via an internal control line 707. Between the control system 705 and the controlled apparatus 706, information 708 relating to control instructions (service providing instructions) and controlled results (service provided results) is exchanged.

In such a control system 705, the controlled apparatus 706 serving as an object system is a hardware unit, such as a fan, a louver, a conveyance passage or a guard unit, which is provided in the same housing as that of the control system 705. As a protocol thereof, a control protocol for the hardware unit is used. If the controlled apparatus 706 is changed from an old style apparatus to an advanced apparatus or to an apparatus produced by another company, it is required to change the data structure and sequence for the control protocol, so that the same problems as those in the above described monitoring system are caused. However, such problems can be solved by the proxy part 40 for controlling the controlled apparatus 706 similar to the above described monitoring system.

As shown in FIG. 30, an information system 709 is connected to an information system 711 via a communication line 710, such as a common carrier leased line, Internet, or radio local area network (LAN), so that various information (service providing instructions and service provided results) 712 are exchanged between the information systems 709 and 711.

In such an information system 709, the information system 711 serving as an object system is an external system which is equal to the information system 709, and a communication protocol for exchanging information is used as the protocol. Specifically, if the communication line 711 is Internet (Web system), HTTP (Hyper Text Transfer Protocol) is used as the communication protocol, and communication is realized in accordance with a data format called HTML (Hyper Text Markup Language). However, recently, XML (eXtensible Markup Language) is widely noticed, so that there is some possibility that a new communication protocol corresponding to this data format is used. Therefore, there is the possibility that the same problems as those in the above described monitoring system are caused in accordance with the change of the communication protocol. However, similar to the above described monitoring system and control system, such problems can be solved by the proxy part 40 for exchanging information between the information system 709 and the information system 711 serving as an external system.

As described above, according to the present invention, it is possible to improve the stability of the architecture of a software against specification change and extension, and it is possible to improve the reusability and change facility of the software.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method for constructing a service providing system using a framework for service providing system which provides a service for an object system, said method comprising the steps of:

preparing a framework for service providing system, which includes a data holding part for holding data relating to an object system for which a service providing system constructed by said framework provides a service, a user interface part for receiving instructions from a user comprising an end user and for presenting data to the user when the user employs the constructed service providing system, the user interface part providing an interface between a computer and the user using the computer, an object system interface part for exchanging data between the object system interface part and said object system in accordance with a predetermined protocol, and an integrated control part for controlling said data holding part, said user interface part and said object system interface part;

preparing a plurality of classes on the basis of each of said data holding part, said user interface part, said object system interface part and said integrated control part of said framework for service providing system;

associating said classes with each other; and defining a sequence carried out between the respective classes wherein said object system interface part of said framework for service providing system converts external data, which are exchanged between said object system interface part and said object system, into a format of intermediate data which is independent of said protocol, and said integrated control part of said framework for service providing system converts said intermediate data into a format of internal data which is handled in said service providing system, said data holding part and user interface part of said framework for service providing system handling said internal data which have been converted by said integrated control part.

2. A method as set forth in claim 1, wherein said integrated control part of said framework for service providing system controls data which are held in said data holding part, and connects said data holding part with said user interface part to provide various services for said object system on the basis of data which are given from said user of said object system.

3. A method as set forth in claim 1, wherein said service providing system is a monitoring system for monitoring an external apparatus serving as said object system.

4. A method as set forth in claim 1, wherein said service providing system is a control system for controlling a controlled apparatus serving as said object system.

5. A method as set forth in claim 1, wherein said service providing system is an information system for exchanging information between the service providing system and an information system serving as said object system.

6. A service providing system for exchanging service providing instructions and service provided results between the service providing system and an object system to provide various services for said object system, said service providing system comprising:

a data holding part for holding data which relate to an object system for which a service providing system constructed by said framework provides a service;

a user interface part for receiving instructions from a user comprising an end user and for presenting data to said user when the user employs the constructed service providing system, the user interface part providing an interface between a computer and the user using the computer;

an object system interface part for exchanging data between the object system interface part and said object system; and an integrated control part for controlling said data holding part, said user interface part and said object system interface part, wherein said integrated control part controls data which are held in said data holding part, and connects said data holding part with said user interface part to provide various services for said object system on the basis of data which are given from said user or said object system and said object system interface part converts external data, which are exchanged between said object system interface part and said object system, into a format of intermediate data which is independent of said protocol, and said integrated control part converts said intermediate data into a format of internal data which is handled in said service providing system, said data holding part and user interface part handling said internal data which have been converted by said integrated control part.

7. A computer readable recording medium, in which a program for service providing system has been recorded, said program for service providing system comprising, as means for operating a computer:
- data holding means for holding data which relate to an object system for which a service providing system constructed by said framework provides a service;
- user interface means for receiving instructions from a user comprising an end user and for presenting data to said user when the user employs the constructed service providing system, the user interface part providing an interface between a computer and the user using the computer;
- object system interface means for exchanging data between said object system interface means and said object system; and
- integrated control means for controlling said data holding means, said user interface means and said object system interface means,
- wherein said integrated control means controls data which are held in said data holding means, and connects said data holding means with said user interface means to provide various services for said object system on the basis of data which are given from said user or said object system and said object system interface means converts external data, which are exchanged between said object system interface means and said object system, into a format of intermediate data which is independent of said protocol, and said integrated control means converts said intermediate data into a format of internal data which is handled in said service providing system, said data holding means and user interface means handling said internal data which have been converted by said integrated control means.

8. A computer readable recording medium, in which a program for service providing system has been recorded, said program for service providing system comprising, as means for operating a computer:
- internal system means for realizing various services which are provided for an object system for which a service providing system constructed by said framework provides a service, the user interface part providing an interface between a computer and a user comprising an end user using the computer;
- object system interface means for exchanging data between said object system interface means and said object system; and
- integrated control means for controlling said internal system means and said object system interface means,
- wherein said object system interface means converts external data, which are exchanged between said object system interface means and said object system, into a format of intermediate data which is independent of a protocol, and said integrated converts said intermediate data into a format of internal data which is handled by said internal system.

9. A computer readable recording medium, in which a framework for service providing system has been recorded, said framework for service providing system comprising:
- a data holding part for holding data which relate to an object system for which a service providing system constructed by said framework provides a service;
- a user interface part for receiving instructions from a user comprising an end user and for presenting data to said user when the user employs the constructed service providing system, the user interface part providing an interface between a computer and the user using the computer;
- an object system interface part for exchanging data between said object system interface part and said object system; and
- an integrated control part for controlling said data holding part, said user interface part and said object system interface part,
- wherein said integrated control part controls data which are held in said data holding part, and connects said data holding part with said user interface part to provide various services for said object system on the basis of data which are given from said user or said object system and said object system interface part converts external data, which are exchanged between said object system interface part and said object system, into a format of intermediate data which is independent of said protocol, and said integrated control part converts said intermediate data into a format of internal data which is handled in said service providing system, said data holding part and user interface part handling said internal data which have been converted by said integrated control part.

10. A computer readable recording medium as set forth in claim 9, wherein each of said data holding part, said object system interface part and said integrated control part includes a class which is prepared for every kind of object systems, and said user interface part includes a class which is prepared for every kind of screens for interface.

11. A computer readable recording medium as set forth in claim 10, wherein said class included in said data holding part is prepared for every kind of data, which are used in said object systems, in addition to the kind of said object systems.

12. A computer readable recording medium as set forth in claim 10, wherein said class included in said integrated control part is prepared for every kind of services, which are provided for said object systems, in addition to the kind of said object systems.

13. A computer readable recording medium as set forth in claim 12, wherein said class included in said integrated control part includes an upper class, which is prepared for every kind of said object systems, and a lower class which is prepared for every kind of services which are provided for said object systems under said upper class.

14. A computer readable recording medium as set forth in claim 9, wherein a class included in said integrated control part controls a class included in said data holding part; a class included in said user interface part updates and refers to said class included in said data holding part; data, which are given from said user and said object system, are exchanged between said class included in said user interface part and said class included in said integrated control part; and data, which relate to a service provided for said object system, are exchanged between said class included in said integrated control part and said class included in said object system interface part.

15. A computer readable recording system as set forth in claim 9, wherein when service providing instructions for said object system are given to a class included in a user interface part, said class included in said user interface part reflects data, which relate to service providing instructions, in a class included in said data holding part, and gives a class included in said integrated control part notice of said service providing instructions, and said class included in said integrated control part acquires data of said class included in said data holding part, and transmits data of said class, which is included in said data holding part, to a class included in said object system interface part, said class included in said object system interface part adding data, which relate to a protocol, to data received from said integrated control part.

16. A computer readable recording medium as set forth in claim 9, wherein when service provided results from said object system are given to a class included in an object system interface part, said class included in said object system interface part deletes data, which relate to a protocol, from data received from said object system, and gives a class, which is included in said integrated control part, notice of service provided results, said class included in said integrated control part reflecting data, which relate to service provided results, in a class included in said data holding part, and giving a class, which is included in said user interface, notice of service provided results, and said class included in said user interface part acquiring data, which relate to service provided results, from said class included in said data holding part.

* * * * *

UNITED STATES PATENT AND TRADEMARK OFFICE
CERTIFICATE OF CORRECTION

PATENT NO.     : 6,968,534 B1
DATED          : November 22, 2005
INVENTOR(S)    : Hayase It is certified that error appears in the above-identified patent and that said Letters Patent is hereby corrected as shown below:

Column 23,
Line 65, change "integrated converts" to -- integrated control means converts --.

Signed and Sealed this

Seventh Day of February, 2006

JON W. DUDAS
*Director of the United States Patent and Trademark Office*